United States Patent [19]

Uetani et al.

[11] Patent Number: 5,205,965
[45] Date of Patent: Apr. 27, 1993

[54] ORGANIC POLYMER SOLUTION

[75] Inventors: Yoshihiro Uetani; Masao Abe; Akira Ohtani; Minoru Ezoe, all of Osaka, Japan

[73] Assignee: Nitto Denko Corporation, Osaka, Japan

[21] Appl. No.: 822,981

[22] Filed: Jan. 21, 1992

[30] Foreign Application Priority Data

Feb. 1, 1991 [JP] Japan .................................. 3-12316
Oct. 21, 1991 [JP] Japan .................................. 3-272168

[51] Int. Cl.$^5$ .......................................... H01B 1/00
[52] U.S. Cl. ............................... 252/500; 252/512; 252/518; 528/422; 525/540; 524/612
[58] Field of Search ............... 252/500, 512, 518; 528/390, 422; 525/540; 524/612

[56] References Cited

U.S. PATENT DOCUMENTS

| | | | |
|---|---|---|---|
| 4,615,829 | 10/1986 | Tamura et al. | 252/519 |
| 5,008,041 | 4/1991 | Cameron et al. | 525/540 |
| 5,079,096 | 1/1992 | Miyake et al. | 252/500 |
| 5,095,076 | 3/1992 | Clement et al. | 528/422 |

FOREIGN PATENT DOCUMENTS 0361429 9/1989 European Pat. Off. .

OTHER PUBLICATIONS

World Patents Index Latest, Derwent Publications Ltd., London, GB; AN 90-300729 & JP-A-2 211 230 Aug. 22, 1990 (Nitto Denko) "abstract".

Primary Examiner—Paul Lieberman
Assistant Examiner—M. Kopec
Attorney, Agent, or Firm—Sughrue, Mion, Zinn, Macpeak & Seas

[57] ABSTRACT

An organic polymer solution comprising an organic solvent and, dissolved therein, (a) an organic polymer which has an imino-p-phenylene structural unit of the formula

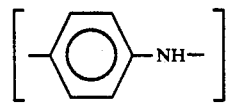

as a major repeating unit and is organic solvent-soluble, (b) a protonic acid having a $pK_a$ value of 4.8 or less or a derivative thereof, (c) at least one member selected from the group consisting of an oxidizing agent which does not have oxidizing ability at ordinary temperature but has oxidizing ability at temperatures not lower than 60° C., and an oxidation catalyst.

3 Claims, 9 Drawing Sheets

ORGANIC POLYMER SOLUTION

FIELD OF THE INVENTION

The present invention relates to a novel organic polymer solution. More particularly, the present invention relates to an organic polymer solution which contains, dissolved therein, a polyaniline, a protonic acid or a derivative thereof, and an oxidizing agent having no oxidizing ability at ordinary temperature but having oxidizing ability at temperatures of 60° C. or higher (hereinafter often referred to as "a high-temperature-activable oxidizing agent") and/or an oxidation catalyst, and from which a film comprising an electrically conductive polyaniline can readily be obtained by, for example, casting and heat-drying.

BACKGROUND OF THE INVENTION

A process for producing an electrically conductive organic polymer containing electrolyte ions as a dopant and having an electrical conductivity of $10^{-6}$ S/cm or more is already known which comprises subjecting aniline to chemical oxidative polymerization with the aid of a chemically oxidizing agent (U.S. Pat. No. 4,615,829). Further, there is described in JP-A-61-258831 that an oxidizing agent which can be used particularly advantageously in the above process for producing a conductive organic polymer through chemical oxidative polymerization is one whose standard electrode potential defined as the electromotive force in a reductive half-cell reaction using a standard hydrogen electrode as the standard electrode is 0.6 V or more. (The term "JP-A" as used herein means an "unexamined published Japanese patent application".)

However, since electrically conductive organic polymers generally are insoluble and infusible, they cannot be formed into films by casting, and this constitutes a serious obstacle to the expansion of applications of conductive organic polymers. Although a film of a conductive organic polymer can be formed on an electrode by the electrochemical oxidative polymerization of aniline as described in JP-A-60-235831 and J. Polymer Sci., Polymer Chem. Ed., 26, 1531 (1988), this method is defective in that the electrode surface is the only place where the film can be formed and it is hence difficult to obtain a large-sized film, and that the production cost is high because the process utilizes electrochemical oxidation. A further drawback of the above film-forming method is that the film obtained is low in strength and is insoluble and infusible.

Various processes have, therefore, been proposed to date which comprise producing an intermediate soluble in organic solvents, casting a solution of the intermediate to form a film thereof, and then converting the intermediate into an electrically conductive polymer by a physical or chemical means. However, this method is defective in that it necessitates a high-temperature treatment or the conversion from intermediate to conductive polymer does not always proceed in accordance with the theory. Hence, such processes for producing a conductive organic polymer film are unpractical from both a production standpoint and the standpoint of the properties of films obtained.

In the field of polypyrroles or polythiophenes, polymers soluble in organic solvents are known. Such polymers can be obtained by a method in which a thiophene having a long-chain alkyl group as a substituent or a pyrrole having an alkanesulfonic acid group as a substituent is polymerized by means of electrochemical oxidative polymerization to give a poly(3-alkylthiophene) soluble in organic solvents or a poly(pyrrole-alkane-sulfonic acid) soluble in water, respectively. Either of these polymers can be formed into a film by casting a solution of the polymer. However, the above method is defective in that the production cost is exceedingly high because in either process, a special monomer is used and this monomer is polymerized by electrochemical oxidative polymerization.

On the other hand, in the field of the chemical oxidative polymerization of aniline, it has recently been reported that an organic solvent-soluble polyaniline can be obtained by the chemical oxidation polymerization of aniline using ammonium peroxodisulfate as an oxidizing agent in an amount of about $\frac{1}{4}$ mol per mol of the aniline (A. G. MacDiarmid et al., Synthetic Metals, 21, 21 (1987); A. G. MacDiarmid et al., L. Alcacer (ed.), Conducting Polymers, 105–120 (D. Reidel Publishing Co., 1987)).

This polymer, however, has a low molecular weight as is apparent from the fact that it is soluble not only in N-methyl-2-pyrrolidone and dimethyl sulfoxide but in 80% acetic acid and 60% formic acid aqueous solutions. There is also described in the above literature references that a self-supporting film can be obtained from a solution of the polymer in N-methyl-2-pyrrolidone or dimethyl sulfoxide. Furthermore, there is also described that a conductive polymer film doped with acetic acid can be obtained from an acetic acid solution of the polymer and this film can be undoped with ammonia to eliminate the dopant. However, this undoped film does not fit for practical use, because its strength is low due to the low molecular weight of the polyaniline so that the film readily develops cracks upon bending.

It is also known that a polyaniline soluble in tetrahydrofuran can be obtained by oxidizing aniline with ammonium peroxodisulfate (J. Tang, Synthetic Metals, 24, 231 (1988)). However, this polymer also is thought to have a low molecular weight because it is soluble in tetrahydrofuran.

The present inventors made intensive studies to obtain a high molecular weight organic polymer soluble in organic solvents particularly by chemical oxidative polymerization of aniline. As a result, a quinonediimine-phenylenediamine type polyaniline was found which had a far higher molecular weight than the conventional polyanilines and which was soluble, in its undoped state, in various organic solvents despite its high molecular weight (JP-A-3-28229).

By use of a solution prepared by dissolving this polyaniline in an organic solvent, a free-standing polyaniline film can be obtained or a polyaniline film can be formed on a suitable substrate. It is also possible to obtain a conductive polyaniline film from such a film by immersing either of the above films in a protonic acid having a $pK_a$ value of 4.8 or less or in a solution of such a protonic acid thereby to dope the polymer with the protonic acid.

Further studies of the above-described quinonediimine-phenylenediamine type polyaniline (hereinafter often referred to as "oxidized-type polyaniline") which in its undoped state was soluble in organic solvents were made extensively by the present inventors. As a result, it was found that a polyaniline soluble in organic solvents even in its doped state could be obtained by reducing the oxidized-type polyaniline with a reducing agent to form an organic solvent-soluble imino-p-phenylene type polyaniline (hereinafter often referred to as "reduced-type polyaniline") and then doping this polyaniline with a specific electron acceptor (JP-A-3-52929).

Use of a solution containing such a doped polyaniline enables easy production of a conductive polyaniline film by casting which film not only has free-standing characteristics but is tough and flexible. Further, by casting or coating the solution on a suitable substrate, a conductive polyaniline film having toughness and flexibility can be formed on the substrate.

However, the above-described method for obtaining a conductive polyaniline has a disadvantage that it is useful only when an electron-acceptive dopant, i.e., an oxidizing dopant, is used as the dopant. In other words, the above method is not applicable to protonic acid dopants which do not have oxidizing ability.

The mechanism of the formation of the conductive polyaniline is as follows. When the reduced-type polyaniline contacts with an oxidizing dopant, an electron is drawn out from the unshared electron pair on a nitrogen atom in the polyaniline to yield a semiquinone radical and, as a result, the polyaniline comes to have electrical conductivity. Therefore, even if the reduced-type polyaniline is doped with a non-oxidizing protonic acid dopant, this only results in mere protonation of the polyaniline, so that a semiquinone radical is not yielded and the polyaniline remains electrically non-conductive

SUMMARY OF THE INVENTION

Under the above-described circumstances, the present inventors have made intensive studies to obtain an electrically conductive polyaniline film directly from a polyaniline solution containing a protonic acid as a dopant. As a result, it has now been found that a conductive polyaniline can be readily obtained from a solution containing a reduced-type polyaniline and a protonic acid, by incorporating a high temperature-activable oxidizing agent into the solution, casting the resulting solution, which retains a stable solution state at room temperature even at considerably high polyaniline concentrations, and then heat-drying the cast solution. The present invention has been completed based on this finding.

The present invention provides an organic polymer solution comprising an organic solvent and, dissolved therein, (a) an organic polymer which has an imino-p-phenylene structural unit of the formula

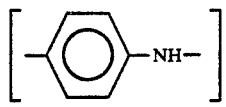

as a major repeating unit and is organic solvent-soluble, (b) a protonic acid having a $pk_a$ value of 4.8 or less or a derivative thereof, and (c) at least one member selected from the group consisting of an oxidizing agent which does not have oxidizing ability at ordinary temperature but has oxidizing ability at temperatures of 60° C. or more, and an oxidation catalyst.

DETAILED DESCRIPTION OF THE INVENTION

Figure 1:
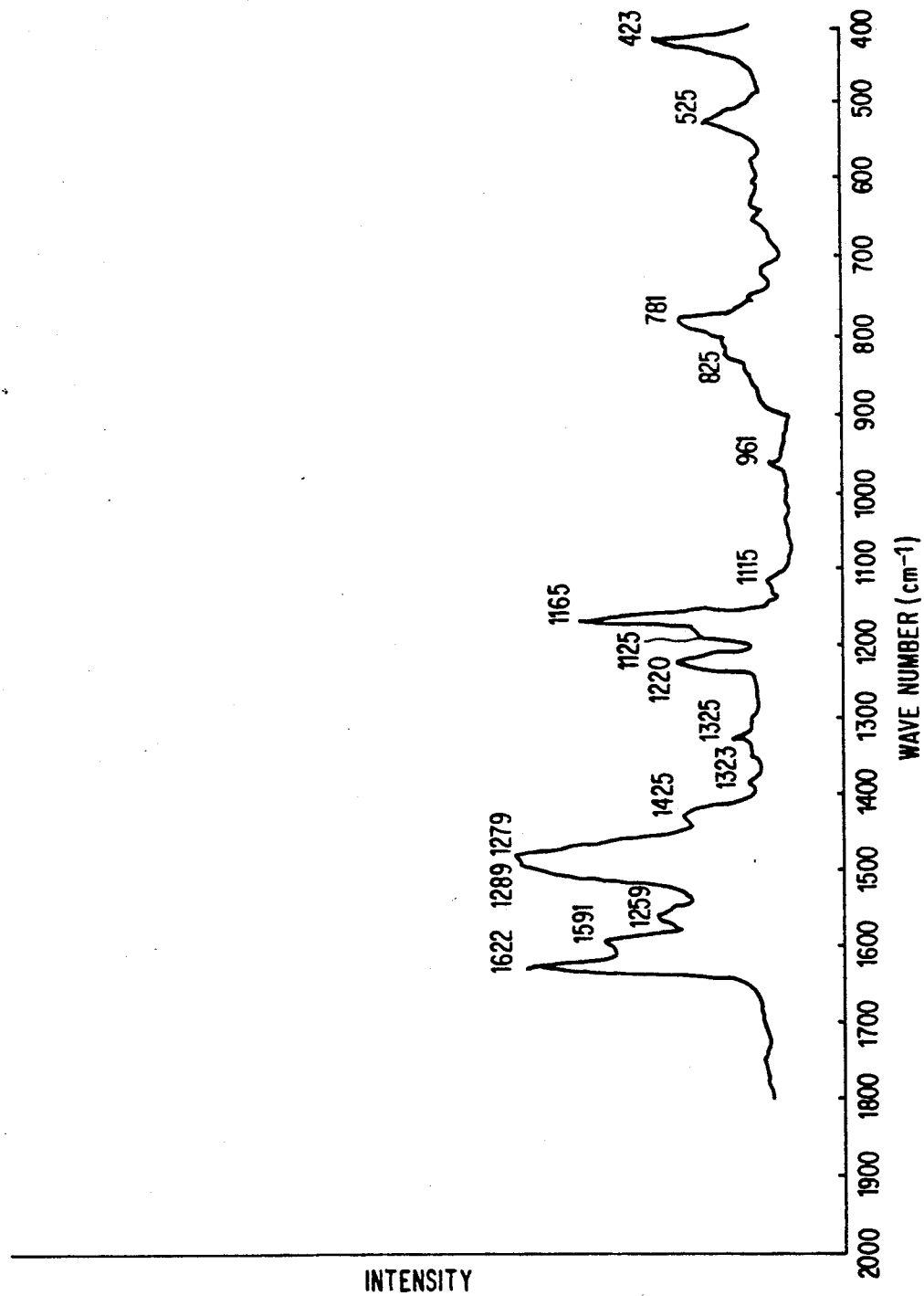
FIG. 1 is a laser Raman spectrum of an undoped, quinonediimine-phenylenediamine type solvent-soluble polyaniline excited by 457.9 nm light.

First, the imino-p-phenylene type solvent-soluble polyaniline is explained below with respect to a production method therefor.

The imino-p-phenylene type solvent-soluble polyaniline can be obtained by reducing a quinonediimine-phenylenediamine type solvent-soluble polyaniline, or an oxidized-type polyaniline, with a reducing agent. This quinonediimine-phenylenediamine type solvent-soluble polyaniline is an organic polymer which contains, as major repeating units, a quinonediimine structural unit and phenylenediamine structural unit shown by the formula

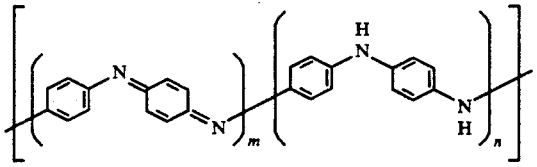

wherein m and n indicate the molar fraction of the quinonediimine structural unit as one repeating unit and that of the phenylenediamine structural unit as another repeating unit, respectively, and satisfy the equations $0<m<1$, $0<n<1$, and $m+n=1$, is soluble in organic solvents in its undoped state, and has an intrinsic viscosity [η] of 0.40 dl/g or more as measured at 30° C. in N-methyl-2-pyrrolidone, and which, when excited by 457.9 nm light, gives a laser Raman spectrum in which the intensity, Ia, of a Raman line assigned to the ring stretching vibration of para-substituted benzene and appearing at a wave number higher than 1,600 cm$^{-1}$ and the intensity, Ib, of a Raman line assigned to the ring stretching vibration of parasubstituted benzene and appearing at a wave number lower than 1,600 cm$^{-1}$ are such that the Ia/Ib ratio is 1.0 or more.

The quinonediimine-phenylenediamine type solvent-soluble polyaniline can be obtained by the following method. That is, in the presence of a protonic acid having an acid dissociation constant, pK$_a$ value, of 3.0 or less, an aqueous solution of an oxidizing agent whose standard electrode potential defined as the electromotive force in a reductive half-cell reaction using a standard hydrogen electrode as the standard electrode is 0.6 V or more is gradually added at a temperature of 5° C. or lower, preferably 0° C. or lower, to aniline in a solvent in an amount of 2 equivalents or more, preferably from 2 to 2.5 equivalents, per mol of the aniline, provided that one equivalent for the oxidizing agent is defined as the amount obtained by dividing 1 mol of the oxidizing agent by the number of electrons necessary for reducing one molecule of the oxidizing agent. Thus, an aniline polymer doped with the protonic acid is yielded through oxidative polymerization. This polymer is then undoped with a basic substance, thereby to give a quinonediimine-phenylenediamine type solvent-soluble polyaniline.

Particularly preferred examples of the oxidizing agent used in the above process for producing an oxidized-type polyaniline doped with a protonic acid include manganese dioxide, ammonium peroxodisulfate, hydrogen peroxide, ferric salts, iodates, and the like. Of these, ammonium peroxodisulfate and hydrogen peroxide, for example, are usually used in an amount in the range of from 1 to 1.25 mol per mol of the aniline, because in each of the two oxidizing agents, two electrons per molecule take part in the oxidative reaction.

The protonic acid used in the oxidative polymerization of aniline is not particularly limited as long as its acid dissociation constant, pK$_a$ value, is 3.0 or less. Examples thereof include inorganic acids such as hydrochloric acid, sulfuric acid, nitric acid, perchloric acid, borofluoric acid, phosphofluoric acid, hydrofluoric acid, hydriodic acid, and the like, aromatic sulfonic acids such as benzenesulfonic acid, p-toluenesulfonic acid, and the like; alkanesulfonic acids such as methanesulfonic acid, ethanesulfonic acid, and the like; phenols such as picric acid and the like; aromatic carboxylic acids such as m-nitrobenzoic acid and the like; and aliphatic carboxylic acids such as dichloroacetic acid, malonic acid, and the like. A polymeric acid may also be used as the protonic acid. Examples of the polymeric acid include poly(styrenesulfonic acid), poly(vinylsulfonic acid), poly(allylsulfonic acid), poly(vinylsulfuric acid), and the like.

The amount of a protonic acid used depends on the reaction mode for the oxidizing agent used. For example, in the case where the oxidizing agent is manganese dioxide, a protonic acid should be used in an amount such that the amount of protons provided thereby is at least 4 times in mol the amount of the manganese dioxide used, since the oxidative reaction in this case is shown by the following scheme.

$$MnO_2 + 4H^+ + 2e^- \rightarrow Mn^{2+} + 2H_2O$$

In the case of hydrogen peroxide also, a protonic acid should be used in an amount such that the amount of protons provided thereby is at least 2 times in mol the amount of the hydrogen peroxide used, since the oxidative reaction is shown by the following scheme.

$$H_2O_2 + 2H^+ + 2e^- \rightarrow 2H_2O$$

On the other hand, in the case of ammonium peroxodisulfate, there is no need to particularly use a protonic acid, because the oxidative reaction is shown by the following scheme.

$$S_2O_8^{2-} + 2e^- \rightarrow 2SO_4^{2-}$$

However, even when ammonium peroxodisulfate is used as the oxidizing agent, it is preferred in the present invention to use a protonic acid in an amount equal in mol to the amount of the oxidizing agent.

As the solvent for the oxidative polymerization of aniline, a solvent which dissolves the aniline, the protonic acid and the oxidizing agent used and which is not oxidized by the oxidizing agent is used. Water is most preferably used. If required and necessary, however, an alcohol such as methanol or ethanol, a nitrile such as acetonitrile, a polar solvent such as N-methyl-2-pyrrolidone or dimethyl sulfoxide, an ether such as tetrahydrofuran, or an organic acid such as acetic acid can be used. Further, a mixed solvent of water and one or more of these organic solvents can also be used.

In the production of the oxidized-type polyaniline doped with a protonic acid, it is important that the temperature of the reaction mixture should be maintained at 5° C. or lower during the oxidative reaction of aniline, especially throughout the addition of an oxidizing agent solution to an aniline solution. Therefore, it is necessary that the oxidizing agent solution is added to aniline gradually in order that the temperature of the reaction mixture is not raised above 5° C. If an oxidizing agent is added rapidly, the temperature of the reaction mixture rises too high even with external cooling and, as a result, a polymer having a low molecular weight is yielded or an oxidized-type polymer insoluble in solvents even after undoping, which will be described later, is yielded.

It is particularly preferred that the temperature of the reaction mixture is maintained at 0° C. or lower during the above oxidative reaction. By undoping the doped oxidized-type polyaniline obtained by the oxidative reaction in which the reaction temperature was maintained at 0° C. or lower, a quinonediimine-phenylenediamine type solvent-soluble polyaniline, i.e., an oxidized-type polyaniline, having a high molecular weight can be obtained which has an intrinsic viscosity [η] as measured at 30° C. in N-methyl-2-pyrrolidone (the same will apply to the intrinsic viscosities appearing hereinafter) of 1.0 dl/g or more.

Since the oxidized-type polyaniline doped with the protonic acid used is obtained in the form of a salt with the protonic acid, it in most cases is not dissolved in ordinary organic solvents at a high concentration such that preparation of a free-standing film from the solution is possible. Although it is generally well known that salts of high molecular weight amines are sparingly soluble in most organic solvents, it is possible to obtain a solvent-soluble oxidized-type polyaniline by undoping the above organic solvent-insoluble oxidized-type polyaniline.

This solvent-soluble oxidized-type polyaniline, obtained by undoping the solvent-insoluble oxidized-type polyaniline doped with the protonic acid used, may be doped, for example, with an organic acid such as malonic acid after being dissolved, for example, in N-methyl-2-pyrrolidone at a low concentration, whereby a doped oxidized-type polyaniline retaining solvent solubility can be obtained.

The basic substance used for the undoping of the oxidized-type polyaniline doped with a protonic acid is not particularly limited as long as the basic substance employed is able to neutralize the dopant protonic acid, since the undoping is a kind of neutralization reaction. Preferably, however, ammonia water or a metal hydroxide such as sodium hydroxide, potassium hydroxide, lithium hydroxide, magnesium hydroxide, calcium hydroxide, or the like is used. The undoping may be conducted by adding a basic substance directly to the reaction mixture after the oxidative polymerization of aniline. Alternatively, the undoping may be performed by first isolating the oxidized-type polyaniline obtained and then adding a basic substance thereto.

The doped oxidized-type polyaniline obtained by the oxidative polymerization of aniline usually has an electrical conductivity of $10^{-6}$ S/cm or more and is of a blackish green color, but it assumes a purple or purplish copper color upon undoping. This color change is ascribable to the conversion of the amine nitrogen in a salt structure of the oxidized-type polyaniline to a free amine. The electrical conductivity of the undoped polyaniline usually is on the order of $10^{-10}$ S/cm.

The thus-obtained undoped quinonediimine-phenylenediamine type, i.e., oxidized-type, solvent-soluble polyaniline has a high molecular weight and, in addition, is soluble in various organic solvents. Such organic solvents include N-methyl-2-pyrrolidone, N,N-dimethylacetamide, N,N-dimethylformamide, dimethyl sulfoxide, 1,3-dimethyl-2-imidazolidinone, sulfolane, and the like. The solubility of the undoped polyaniline varies depending on the average molecular weight of the polymer and on the solvents, but from 0.5 to 100% of the polymer can generally be dissolved to give solutions having polymer concentrations of from 1 to 30% by weight.

Particularly, the oxidized-type solvent-soluble polyaniline shows high solubility in N-methyl-2-pyrrolidone, and from 20 to 100 wt % of the polymer can usually be dissolved in this solvent to give a solution having a concentration of from 3 to 30% by weight. The oxidized-type polyaniline, however, is insoluble in tetrahydrofuran, 80 wt % acetic acid aqueous solution, 60 wt % formic acid aqueous solution, acetonitrile, or the like.

Since the oxidized-type solvent-soluble polyaniline is soluble in various organic solvents, it can be formed into a film by dissolving it in an organic solvent and casting the solution. For example, a free-standing film of the oxidized-type polyaniline which film is uniform and tough and has excellent flexibility can be obtained by casting a solution of the solvent-soluble polyaniline on a glass plate and then heat-drying the cast solution to remove the solvent under suitably selected conditions.

In order to obtain a film having toughness and excellent flexibility by the above-described film-preparation method, it is desirable that the oxidized-type solvent-soluble polyaniline has an intrinsic viscosity $[\eta]$ of 0.40 dl/g or more.

Films obtained by casting a solution of the oxidized-type solvent-soluble polyaniline have different properties if the drying for removing the solvent was conducted under different conditions. Illustratively stated, in the case where an N-methyl-2-pyrrolidone solution of a soluble polyaniline having an intrinsic viscosity $[\eta]$ of 0.40 dl/g or more is cast on a glass plate and the cast solution is dried for removing the solvent, drying temperatures of 100° C. or lower usually result in a polyaniline film having insufficient strength and partly soluble in N-methyl-2-pyrrolidone, whereas drying temperatures of 130° C. or higher usually result in a polyaniline film which has excellent flexibility and high toughness, does not develop cracks even when bent, and is insoluble in N-methyl-2-pyrrolidone and even in concentrated sulfuric acid. The fact that the polymer becomes solvent-insoluble through such high-temperature drying after casting may be attributable to crosslinking of the polymer as a result of coupling of radicals present in the polymer or formed during the heating.

As described hereinabove, the quinonediimine-phenylenediamine type, i.e., oxidized-type, solvent-soluble polyaniline contains, as major repeating units, a quinonediimine strucutral unit and phenylenediamine structural unit shown by the formula

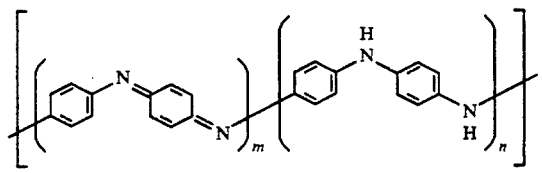

wherein m and n indicate the molar fraction of the quinonediimine structural unit as one repeating unit and that of the phenylenediamine structural unit as another repeating unit, respectively, and satisfy the equations $0<m<1, 0<n<1$, and $m+n=1$; this structure has been determined by elemental analysis, infrared absorption spectroscopy, ESR spectroscopy, laser Raman spectroscopy, thermogravimetric analysis, solubility in solvents, and electronic absorption spectroscopy in the visible and near infrared region.

The solvent-insolubilized film obtained from such quinonediimine-phenylenediamine type solvent-soluble polyaniline by casting shows substantially the same infrared absorption spectrum as that of the solvent-soluble polyaniline. Further, from the results of elemental analysis, infrared absorption spectroscopy, ESR spectroscopy, laser Raman spectroscopy, thermogravimetric analysis, measurement of solvent solubility, electronic absorption spectroscopy in the visible and near infrared region, it can be assumed that the insolubilized film comprises a polymer which is made up of substantially the same repeating units although this polymer has a crosslinked structure.

Features of the quinonediimine-phenylenediamine type solvent-soluble polyaniline in a laser Raman spectrum thereof are explained below along with comparisons thereof with those of conventional polyanilines.

A means generally used for obtaining information concerning vibrations of atoms constituting a substance is vibration spectroscopy, which includes infrared spectroscopy and Raman spectroscopy. In infrared spectroscopy, vibrating modes associated with a change in dipole moment are active, whereas in Raman spectroscopy, vibrating modes associated with a change in polarizability are active. Therefore, the two spectroscopic methods are complementary to each other and, in general, the vibrating modes which are strong in infrared spectroscopy are weak in Raman spectroscopy, while the vibrating modes strong in Raman spectroscopy are weak in infrared spectroscopy.

An infrared absorption spectrum is obtained by detecting energy absorptions which are the differences between vibrational energy levels, while a Raman spectrum is obtained by detecting scattered light (Raman scattering) which is produced when a molecule, after being excited by light irradiation, relaxes to the ground state of a higher vibrational energy level. In the Raman spectrum, the vibrational energy level can be determined by the energy difference between the incident light and the scattered light.

Raman spectra usually are obtained through excitation by irradiation with visible light emitted from an argon laser or other light source. It is known that if the sample has an absorption band in the visible region, a very intense Raman line is obtained when the incident laser light matches in wavelength with the absorption band. This phenomenon is called resonance Raman effect. Using this resonance Raman effect, Raman lines having intensities $10^4$ to $10^5$ times the intensities of ordinary Raman lines can be obtained, so that intensified information of a chemical structure part excited by incident laser light can be obtained at a particular wavelength. Hence, by obtaining a Raman spectrum while changing the wavelength of the laser light with which a sample is irradiated, the chemical structure of the sample can be analyzed more accurately. This is an advantage which is characteristic of Raman spectroscopy and is not possessed by infrared spectroscopy.

FIG. 1 is a laser Raman spectrum of an undoped quinonediimine-phenylenediamine type solvent-soluble polyaniline having an intrinsic viscosity [η] as measured at 30° C. in N-methyl-2-pyrrolidone of 1.2 dl/g, which spectrum was obtained by forming a powder of the polyaniline into a disk and irradiating the disk-form sample at an exciting wavelength of 457.9 nm. Assignments of Raman lines are as follows the lines at 1,622 and 1,591 cm$^{-1}$ are assigned to the ring stretching vibration of para-substituted benzene; those at 1,489 and 1,479 cm$^{-1}$ to the stretching vibrations of C=C and C=N in quinonediimine structure; that at 1,220 cm$^{-1}$ to both C—N stretching vibration and C—C stretching vibration; and those at 1,185 and 1,165 cm$^{-1}$ to the in-plane bending vibration of C—H.

Figure 2:
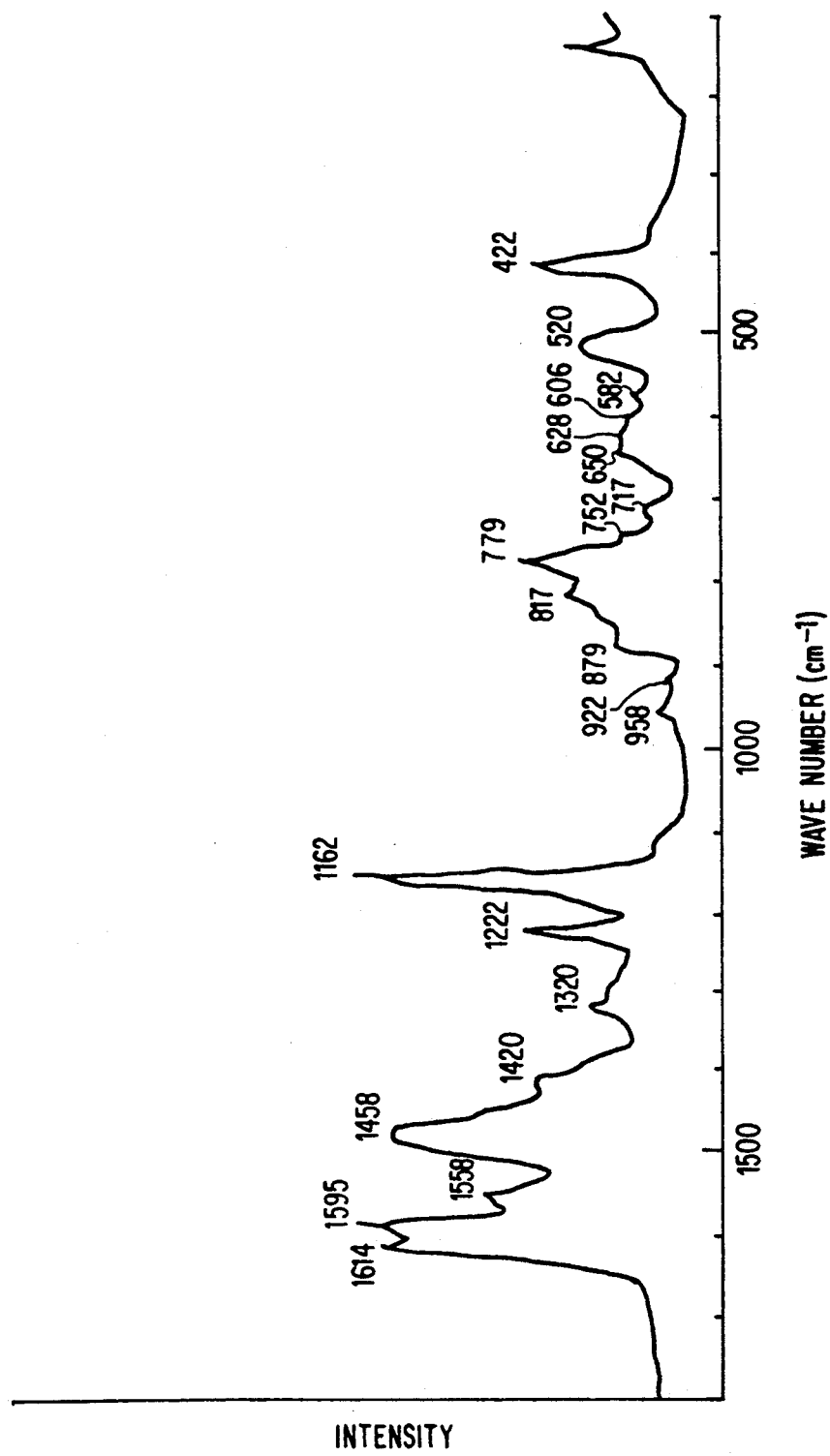
FIG. 2 is a laser Raman spectrum of a conventional polyaniline excited by 457.9 nm light.

FIG. 2 is a laser Raman spectrum of the undoped polyaniline as disclosed in Y. Furukawa et al., Synth. Met., 16, 189 (1986), which spectrum was obtained by irradiating the polyaniline at an exciting wavelength of 457.9 nm. This polyaniline was obtained by the electrochemical oxidative polymerization of aniline on a platinum electrode.

As can be seen from FIG. 1, in the laser Raman spectrum of the quinonediimine-phenylenediamine type solvent-soluble polyaniline, the Ia/Ib ratio is 1.0 or more, provided that Ia is the intensity of the Raman line assigned to the ring stretching vibration of parasubstituted benzene and appearing at a wave number higher than 1,600 cm$^{-1}$ and Ib is the intensity of the Raman line assigned to the same vibration and appearing at a wave number lower than 1,600 cm$^{-1}$. In contrast, all of the conventional polyanilines, including the polyaniline whose laser Raman spectrum is shown in FIG. 2 and the known polyanilines produced by chemical oxidative polymerization, give laser Raman spectra in which the Ia/Ib ratios are below 1.0.

Figure 3:
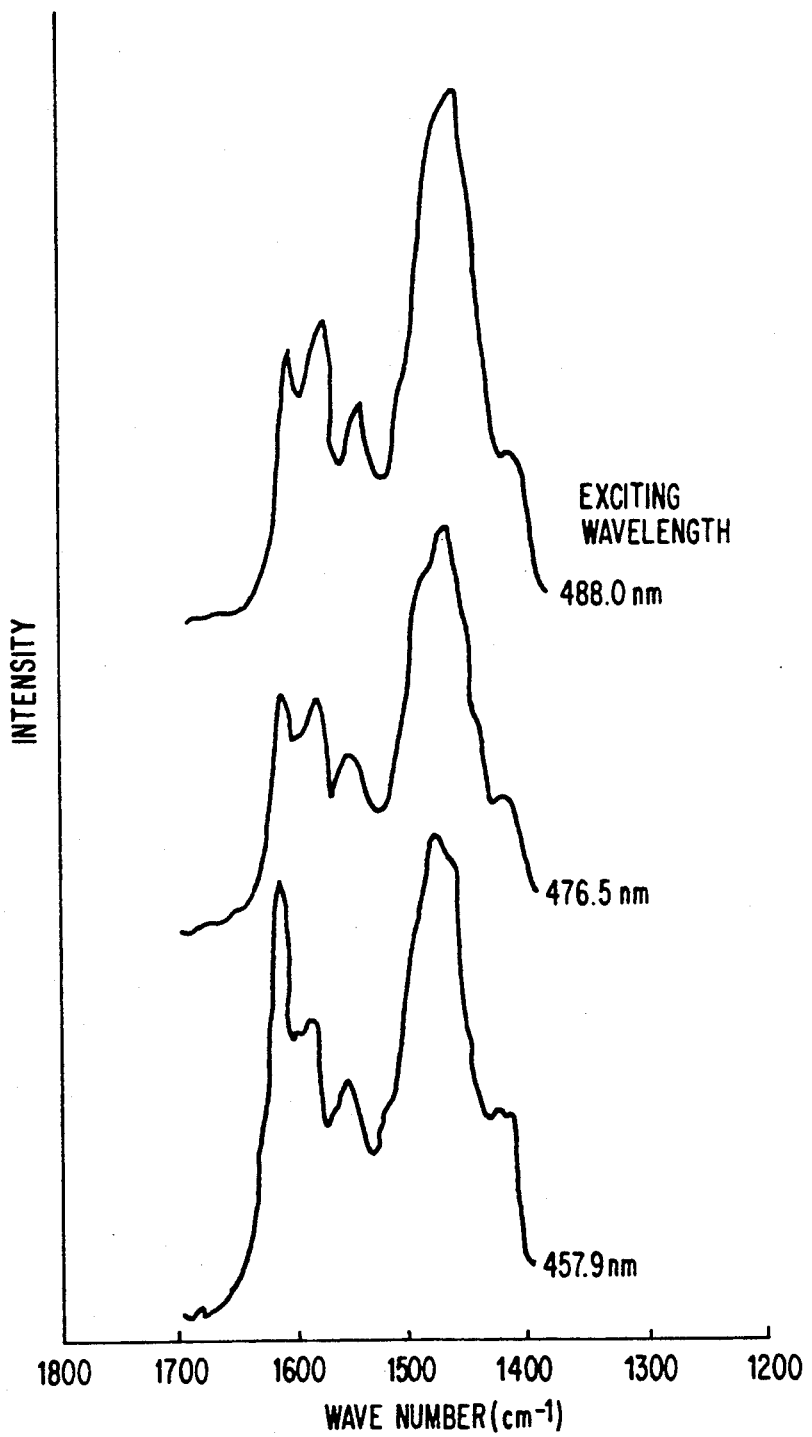
FIG. 3 shows laser Raman spectra of a quinonediimine-phenylenediamine type solvent-soluble polyaniline which is the same as the polyaniline whose laser Raman spectrum is shown in FIG. 1 and which is excited by lights having different exciting wavelengths.

The Raman lines at 1,622 cm$^{-1}$ and 1,591 cm$^{-1}$ are both attributed to the ring stretching vibration of para-substituted benzene. Although a polyaniline in a reduced state shows a Raman line only at 1,621 cm$^{-1}$ because this polyaniline lacks a quinonediimine structure, the undoped polyaniline having a quinonediimine structure shows Raman lines at 1,622 cm$^{-1}$ and 1,591 cm$^{-1}$ as described above. These Raman lines have an exciting-wavelength dependence as shown in FIG. 3.

As the exciting wavelength is changed toward the shorter-wavelength side, that is, from 488.0 nm through 476.5 nm to 457.9 nm, the Ia/Ib ratio changes. That is, the Ia/Ib ratio is below 1.0 at an exciting wavelength of 488.0 nm, but it is 1.0 or more at 457.9 nm. Thus, the relative intensities of Ia and Ib are reversed as the exciting wavelength changes from 488.0 nm to 457.9 nm. This phenomenon will be explained as follows.

Figure 4:
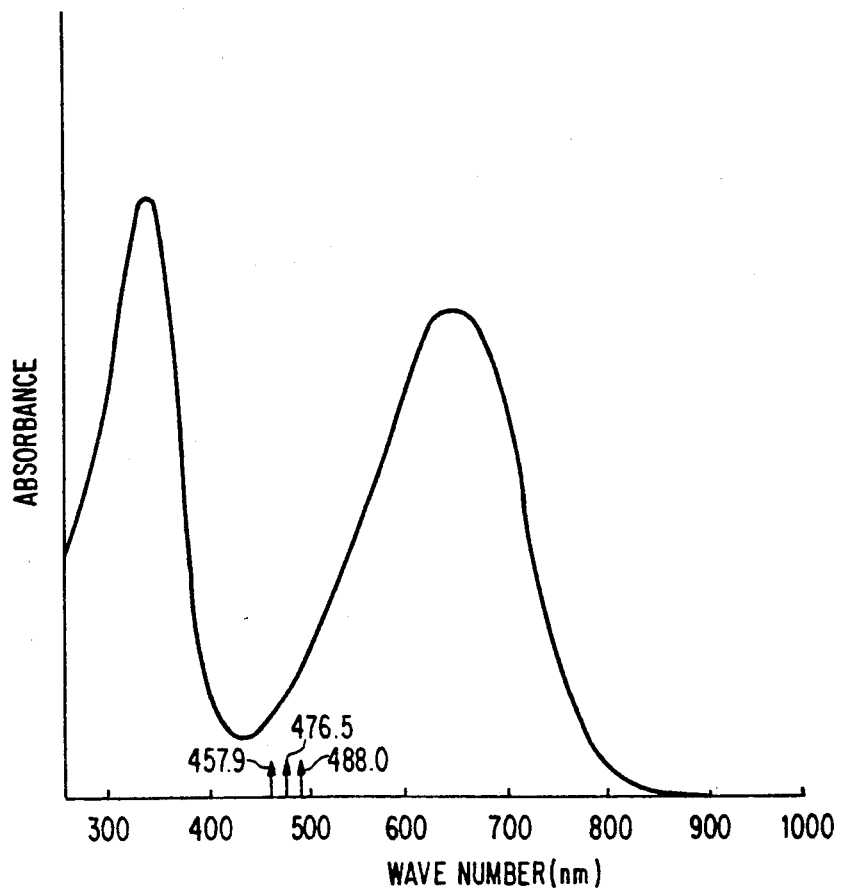
FIG. 4 is an electronic spectrum of a quinonediimine-phenylenediamine type solvent-soluble polyaniline solution in N-methyl-2-pyrrolidone.

FIG. 4 shows an electronic spectrum of the quinonediimine-phenylenediamine type solvent-soluble polyaniline. The peak at 647 nm is regarded as attributable to quinonediimine structure since it disappears upon the reduction of the quinonediimine-phenylenediamine type solvent-soluble polyaniline. The peak at 334 nm, in contrast, increases in intensity through the reduction of the polyaniline and, hence, this peak is regarded as attributable to a $\pi-\pi^*$ transition in para-substituted benzene. In FIG. 4, the Raman exciting wavelengths described above are shown. With respect to the bands attributable to the ring stretching vibration of parasubstituted benzene, the band at 1,622 cm$^{-1}$ becomes more susceptible to the resonance Raman effect than the band at 1,591 cm$^{-1}$ when the exciting wavelength is changed toward the shorter-wavelength side from 488.0 nm to 457.9 nm, and this may result in the above-described change in the relative intensities of Ia and Ib.

Next, the fact that in the spectrum shown in FIG. 1 and FIG. 2, the relative intensities of the Raman lines at 1,591 cm$^{-1}$ and 1,622 cm$^{-1}$ (FIG. 1) or 1,595 cm$^{-1}$ and 1,614 cm$^{-1}$ (FIG. 2) differ although the exciting wavelength is the same (457.9 nm) is explained as follows. Since N,N'-diphenyl-p-phenylenediamine as a model compound having a phenylenediamine structure shows a Raman line only at 1,617 cm$^{-1}$ and N,N'-diphenyl-p-benzoquinonediimine as a model compound having a quinonediimine structure shows Raman lines at 1,568 cm$^{-1}$ and 1,621 cm$^{-1}$, it can be assumed that the parasubstituted benzene ring not conjugated with the quinonediimine structure has a 1,622 cm$^{-1}$ Raman line having enhanced intensity due to excitation by the short-wavelength light, as shown by (a) below, while the parasubstituted benzene ring conjugated with the quinonediimine structure shows Raman lines at 1,591 cm$^{-1}$ and 1,622 cm$^{-1}$ as shown by (b) below.

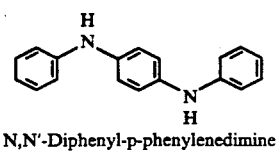

N,N'-Diphenyl-p-phenylenediimine the difference between the relative intensities of the Raman lines at 1,591 cm$^{-1}$ and 1,622 cm$^{-1}$.

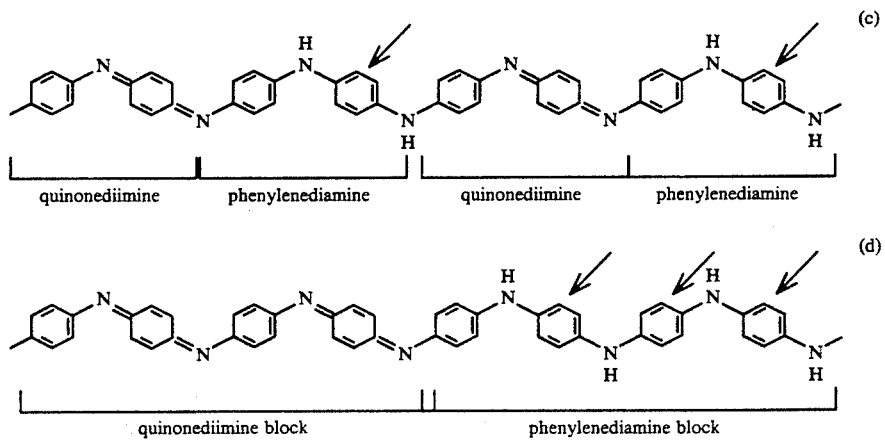

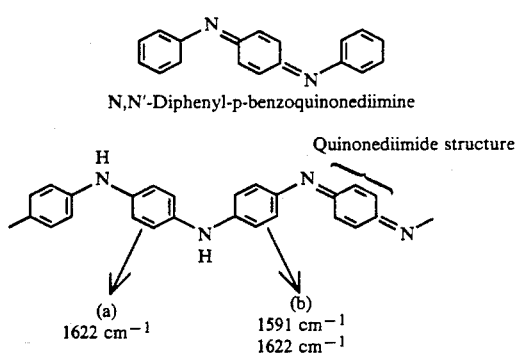

From the results of an elemental analysis of the quinonediimine-phenylenediamine type solvent-soluble polyaniline, the number of quinonediimine structures and that of phenylenediamine structures in the polyaniline molecule are regarded as almost equal. Therefore, such a backbone of the quinonediimine-phenylenediamine type solvent-soluble polyaniline is thought to be made up of chains which are divided into two groups in terms of the arrangement of the quinonediimine and phenylenediamine structures: that is alternating copolymer chains each consisting of an alternating arrangement of the quinonediimine structure and the phenylenediamine structure as shown by (c); and block copolymer chains each having a block segment of one of the quinonediimine and phenylenediamine structures followed by a block segment of the other structure as shown by (d). The para-substituted benzene rings indicated by arrows in the formulae are benzene rings not conjugated with quinonediimine, and the number of such benzene rings per, for example, octamer chain unit is two in the alternating copolymer chains and is three in the block copolymer chains. The difference in the number of benzene rings not conjugated with quinonediimine between the two kinds of copolymer chains becomes larger when the chain unit becomes longer. It can be said that this difference brings about Since the Ia/Ib ratio in the laser Raman spectrum of the quinonediimine-phenylenediamine type solvent-soluble polyaniline is 1.0 or more, it is thought that this polyaniline contains a large proportion of benzene rings not conjugated with a quinonediimine structure and, because of this, the polyaniline has a block copolymer chain of the kind described above.

The organic solvent solubility of the quinonediimine-phenylenediamine type solvent-soluble polyaniline is rationally explained based on the assumption that the polyaniline has such a block copolymer chain. It is generally known that the imine nitrogens (—N=) in a quinonediimine structure form a hydrogen bond with a nearby secondary amino group hydrogen (—NH—) (Macromolecules, 21, 1297 (1988)), but the hydrogen bond between secondary amino groups is not strong.

Therefore, in the case of a polyaniline having an alternating copolymer chain of the kind described above, a strong network based on hydrogen bonds is formed as shown by (f). The fact that the conventionally known polyanilines even in an undoped state are insoluble in many organic solvents may be attributable to the formation of such a strong network based on hydrogen bonds. In contrast to such conventional polyanilines, in the case of a polyaniline whose backbone comprises block copolymer chains of the above-described kind as in the undoped solvent-soluble polyaniline obtained by the method described above, hydrogen bonds cannot be formed in a large number even when a phenylenediamine structure segment and a quinonediimine structure segment come close to each other as can be seen in (e) since the block segments usually have different lengths, and because of such a structure, an organic solvent can penetrate through the polymer chains and, as a result, the polymer forms hydrogen bonds with the solvent and dissolves therein If all the block segments have perfectly the same length, a hydrogen bond-based network as described above will be formed. However, the probability that the polyaniline has such a structure is extremely small and, hence, can usually be negligible.

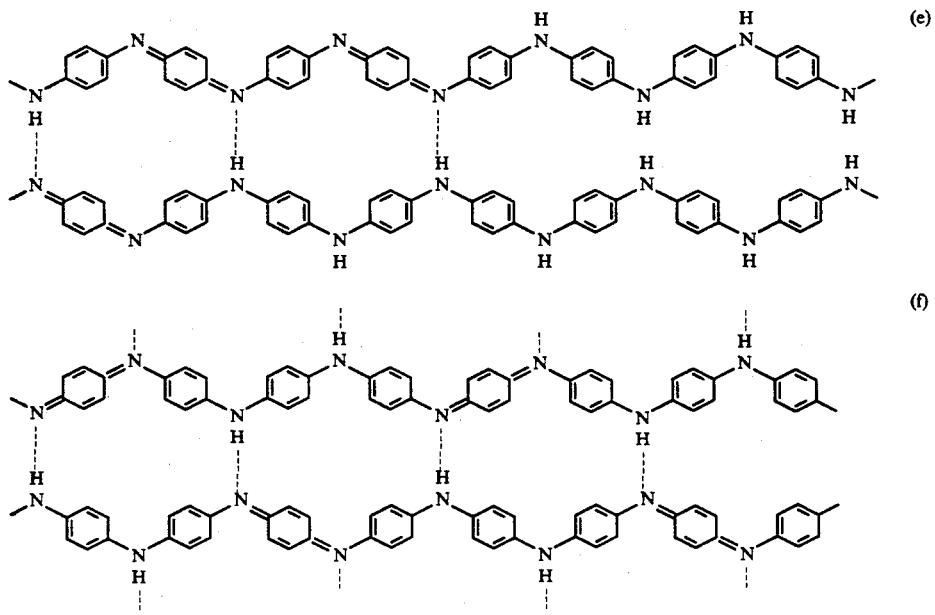

Such an interaction between polyaniline chains can also be explained from the C—H in-plane bending vibration to which a Raman line in the laser Raman spectrum of FIG. 1 is assigned. The Raman line at 1,162 cm$^{-1}$ in the spectrum of FIG. 1 is assigned to the C—H in-plane bending vibration in the undoped quinonediimine-phenylenediamine type solvent-soluble polyaniline. This Raman line at 1,162 cm$^{-1}$ is shifted toward the higher wave number side, i.e., to 1,181 cm$^{-1}$, when the polyaniline is reduced and all the imino nitrogens are converted to secondary amino nitrogens.

As described hereinabove, the quinonediimine-phenylenediamine type solvent-soluble polyaniline in its undoped state shows two Raman lines, at 1,165 and 1,185 cm$^{-1}$, assigned to C—H in-plane bending vibration. The Raman line at 1,185 cm$^{-1}$ does not appear in the laser Raman spectra of conventional undoped polyanilines and its position is close to that of the 1,181 cm$^{-1}$ Raman line shown by a reduced-state polyaniline and assigned to C—H in-plane bending vibration.

It is thought from the above that the quinonediimine-phenylenediamine type solvent-soluble polyaniline in its undoped state has a block copolymer chain and a moiety of a reduced structure. This may be the reason why the undoped quinonediimine-phenylenediamine type polyaniline has high solubility in organic solvents despite its high molecular weight. As is apparent from the above, the quinonediimine-phenylenediamine type solvent-soluble polyaniline disclosed herein is a polymer having a backbone different from those of conventional polyanilines.

There is an explanation that since the oxidized-type polyaniline obtained by the oxidative polymerization of aniline and doped with a protonic acid has block copolymer chains containing a quinonediimine structural unit and a phenylenediamine structural unit as repeating units as described above, the oxidized-type polyaniline in a protonic acid-doped state shows electrical conductivity only by means of an acid-base reaction without causing a redox reaction. This explanation for the electrical conductivity of the polyaniline has been made by A. G. MacDiarmid et al. (A. G. MacDiarmid et al., J. Chem. Soc., Chem. Commun., 1987, 1784) According to this explanation, the quinonediimine structure is protonated as shown below by the doping with a protonic acid to form a semiquinone cation radical structure, whereby the polymer shows electrical conductivity. Such a state of the polymer is called a polaron state.

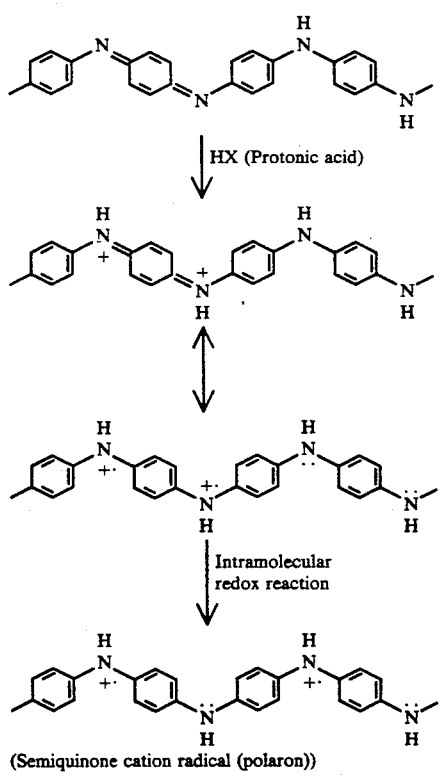

(Semiquinone cation radical (polaron))

The quinonediimine-phenylenediamine type solvent-soluble polyaniline, as described above, can be formed into a free-standing film by dissolving it in an organic solvent and casting the solution. Further, a composite film can also be prepared from the polyaniline by casting a solution of the polyaniline on a suitable substrate. Such a film comprising the polyaniline can be easily made electrically conductive by doping the film with a protonic acid. As this protonic acid, any of the protonic acids enumerated hereinabove can be used.

The polyaniline film before doping is of a copper color in terms of reflected light and is blue in terms of transmitted light, whereas after doping with a protonic acid the film is blue in terms of reflected light and green in terms of transmitted light. Further, the reflectance of the film in the near infrared region (1,000–2,000 nm) changes greatly through doping. That is, the film before doping reflects most of the incident light in the near infrared region, whereas after doping the film absorbs most of the incident near infrared light.

The electrical conductivity of the electrically conductive film obtained by doping varies depending on the $pK_a$ value of the protonic acid used. Protonic acids having $pK_a$ values of 4.8 or less are effective in the doping of the oxidized-type polyaniline. In the case of using protonic acids having $pK_a$ values in the range of from 1 to 4.8, the lower the $pK_a$ value, that is, the higher the acidity, the higher the electrical conductivity of the film obtained. In contrast, where protonic acids having $pK_a$ values below 1 are used, the electrical conductivities of the films obtained are almost the same. However, it is, of course, possible to use a protonic acid having a $pK_a$ value of 1 or less according to need.

The electrical conductivity of the electrically conductive film thus obtained by doping a quinonediimine-phenylenediamine type solvent-soluble polyaniline with a protonic acid usually is $10^{-6}$ S/cm or more, and in most cases $10^{-4}$ S/cm or more.

This conductive film also is so tough that it never readily develops cracks even when bent. However, since this conductive film has been doped with a protonic acid like the conductive polymer produced in the presence of a protonic acid, it is insoluble in the organic solvents described above for the reason described above and because of crosslinking as a result of the coupling of radicals formed by heating during the solvent-evaporating step in the film preparation.

However, by reducing the quinonediimine-phenylenediamine type solvent-soluble polyaniline with a reducing agent, an imino-p-phenylene type solvent-soluble polyaniline which is soluble in increased kinds of organic solvents can be obtained. Further, by preparing a solution containing this solvent-soluble imino-p-phenylene type polyaniline together with a protonic acid and a thiuram compound described after, which solution is one embodiment of the organic polymer solution of the present invention, it becomes possible to readily obtain an electrically conductive polyaniline film from the solution by only casting and drying.

Preferred examples of the reducing agent include hydrazine compounds such as phenylhydrazine, hydrazine, hydrazine hydrate, hydrazine sulfate, hydrazine hydrochloride, and the like, and reducing metal hydride compounds such as lithium aluminum hydride, lithium boron hydride, and the like. Of these, hydrazine hydrate or phenylhydrazine is particularly preferably used as the reducing agent because the reduction reaction using either compound does not form a residue.

The reduction of a quinonediimine-phenylenediamine type solvent-soluble polyaniline with a reducing agent is not particularly limited in method, and may be carried out according to the conventional reduction reaction method. For example, the reduction may be conducted by a method comprising dissolving a quinonediimine-phenylenediamine type solvent-soluble polyaniline in an organic solvent such as N-methyl-2-pyrrolidone and adding to this solution a reducing agent such as those enumerated above; a method comprising dissolving a reducing agent in an organic solvent such as N-methyl-2-pyrrolidone, dimethylformamide, or dimethylacetamide and adding a quinonediimine-phenylenediamine type solvent-soluble polyaniline to this solution; or a method comprising dispersing a quinonediimine-phenylenediamine type solvent-soluble polyaniline in a non-solvent therefor and conducting the reduction reaction of the polyaniline in the heterogeneous system.

The reduction reaction of a quinonediimine-phenylenediamine type solvent-soluble polyaniline for producing the imino-p-phenylene type solvent-soluble polyaniline to be contained in the organic polymer solution of the present invention is conducted in a solution containing the polyaniline at a concentration of usually from 0.1 to 15% by weight, preferably from 0.5 to 10% by weight. The amount of the reducing agent is usually equivalent to the amount of quinonediimine structural units contained in the quinonediimine-phenylenediamine type solvent-soluble polyaniline. However, the reducing agent can be used in an amount more than equivalent in order to accelerate the reaction.

It should, however, be noted that if a reducing agent was used in an excess amount like the above, long-term storage of the thus-obtained imino-p-phenylene type solvent-soluble polyaniline in the resultant solution state may result in a decrease in the molecular weight of the polymer due to molecular chain cleavage. Therefore, it is desirable that if an excess of a reducing agent was used, the imino-p-phenylene type solvent-soluble polyaniline obtained is subjected to reprecipitation to separate and purify the product, followed by doping.

The thus-obtained imino-p-phenylene type solvent-soluble polyaniline has good solubility in more various kinds of organic solvents than the quinonediimine-phenylenediamine type solvent-soluble polyaniline. For example, the imino-p-phenylene type solvent-soluble polyaniline well dissolves also in dimethylformamide, dimethylacetamide, dimethyl sulfoxide, and the like at concentrations as high as several percents by weight or more.

The reason why the imino-p-phenylene type solvent-soluble polyaniline has such better solubility in organic solvents is that this polyaniline has considerably weakened hydrogen bonds between polymer chains because the quinonediimine structures in the polymer chains have disappeared through the reduction, as explained above with reference to the structure analysis of the quinonediimine-phenylenediamine type solvent-soluble polyaniline by means of Raman spectroscopy.

During the reduction reaction of the quinonediimine-phenylenediamine type solvent-soluble polyaniline, substantially no molecular chain cleavage usually occurs. It is ascertained, from a measurement of the intrinsic viscosity $[\eta]$ of the obtained imino-p-phenylene type solvent-soluble polyaniline, that this polyaniline retains the high molecular weight of the quinonediimine-phenylenediamine type solvent-soluble polyaniline which was subjected to the reduction reaction. The thus-obtained imino-p-phenylene type solvent-soluble polyaniline usually has an intrinsic viscosity $[\eta]$ as measured at 30° C. in N-methyl-2-pyrrolidone of 0.40 dl/g or more.

The organic polymer solution according to the present invention can be obtained by dissolving a protonic acid having a pK$_a$ value of 4.8 or less and a high temperature-activable oxidizing agent described after into a solution of the imino-p-phenylene type solvent-soluble polyaniline.

The protonic acid which can be incorporated in the organic polymer solution of the present invention can be an inorganic or organic acid having an acid dissociation constant, pk$_a$ value, of 4.8 or less. Examples of such an inorganic acid include borofluoric acid, phosphofluoric acid, perchloric acid, and the like. If the protonic acid is a mineral acid such as sulfuric acid, hydrochloric acid, or nitric acid, the resulting polymer doped with the mineral acid is difficult to dissolve in organic solvents.

The organic acid having an acid dissociation constant, pK$_a$ value, of 4.8 or less includes mono- or polybasic acids of the aliphatic, aromatic, aromaticaliphatic, or alicyclic type. Such organic acids can contain a hydroxyl group, halogen, nitro group, cyano group, amino group, or the like. Therefore, specific examples of such organic acids include acetic acid, n-butyric acid, pentadecafluorooctanoic acid, pentafluoroacetic acid, trifluoroacetic acid, trichloroacetic acid, dichloroacetic acid, monofluoroacetic acid, monobromoacetic acid, monochloroacetic acid, cyanoacetic acid, acetylacetic acid, nitroacetic acid, triphenylacetic acid, formic acid, oxalic acid, benzoic acid, m-bromobenzoic acid, p-chlorobenzoic acid, m-chlorobenzoic acid, p-chlorobenzoic acid, o-nitrobenzoic acid, 2,4-dinitrobenzoic acid, 3,5-dinitrobenzoic acid, picric acid, o-chlorobenzoic acid, p-nitrobenzoic acid, m-nitrobenzoic acid, trimethylbenzoic acid, p-cyanobenzoic acid, m-cyanobenzoic acid, Thymol Blue, salicylic acid, 5-aminosalicylic acid, o-methoxybenzoic acid, 1,6-dinitro-4-chlorophenol, 2,6-dinitrophenol, 2,4-dinitrophenol, p-oxybenzoic acid, Bromophenol Blue, mandelic acid, phthalic acid, isophthalic acid, maleic acid, fumaric acid, malonic acid, tartaric acid, citric acid, lactic acid, succinic acid, α-alanine, β-alanine, glycine, glycollic acid, thioglycollic acid, ethylenediamine-N,N'-diacetic acid, ethylenediamine-N,N,N',N'-tetraacetic acid, and the like.

An organic acid containing a sulfonic acid group or sulfuric acid group can also be used as the protonic acid. Examples of such organic acids include aminonaphtholsulfonic acid, metanilic acid, sulfanic acid, allylsulfonic acid, laurylsulfuric acid, xylenesulfonic acid, chlorobenzenesulfonic acid, 1-propanesulfonic acid, 1-butanesulfonic acid, 1-hexanesulfonic acid, 1-heptanesulfonic acid, 1-octanesulfonic acid, 1-nonanesulfonic acid, 1-decanesulfonic acid, 1-dodecanesulfonic acid, benzenesulfonic acid, styrenesulfonic acid, p-toluenesulfonic acid, naphthalenesulfonic acid, and the like.

A polyfunctional organic sulfonic acid having two or more sulfonic acid groups per molecule can also be advantageously used as the protonic acid in the present invention. Examples of such polyfunctional organic sulfonic acids include ethanedisulfonic acid, propanedisulfonic acid, butanedisulfonic acid, pentanedisulfonic acid, hexanedisulfonic acid, heptanedisulfonic acid, octanedisulfonic acid, nonanedisulfonic acid, decanedisulfonic acid, benzenedisulfonic acid, naphthalenedisulfonic acid, naphthalenetrisulfonic acid, naphthalenetetrasulfonic acid, anthracenedisulfonic acid, anthraquinonedisulfonic acid, phenanthrenedisulfonic acid, fluorenonedisulfonic acid, carbazoledisulfonic acid, diphenylmethanedisulfonic acid, biphenyldisulfonic acid, terphenyldisulfonic acid, terphenyltrisulfonic acid, naphthalenesulfonic acid-formalin condensates, phenanthrenesulfonic acid-formalin condensates, anthracenesulfonic acid-formalin condensates, fluorenesulfonic acidformalin condensates, carbazolesulfonic acid-formalin condensates, and the like. In these sulfonic acids, the position of each sulfonic acid group on the aromatic ring(s) is arbitrary.

The organic acid used as the protonic acid can also be a polymeric acid. Examples of the polymeric acid include poly(vinylsulfonic acid), poly(vinylsulfuric acid), poly(styrenesulfonic acid), sulfonated styrene-butadiene copolymers, poly(allylsulfonic acid), poly(methacrylsulfonic acid), poly(2-acrylamido-2-methylpropanesulfonic acid), poly(halogenated acrylic acid)s, and the like.

The fluorine-containing polymers known as Nafion (registered trademark of E. I. du Pont de Neumours & Co., Inc.) can also be advantageously used as the polymeric acid.

In general, use of polymeric acids having different molecular weights results in electrically conductive organic polymers which are different in solubility in their doped state. Usually, use of a polymeric acid having a lower molecular weight tends to yield an electrically conductive organic polymer which in its doped state shows better solubility.

In place of the protonic acid described above, its ammonium salt or amine salt can also be used as a dopant. Examples of such dopants include the ammonium salt of p-toluenesulfonic acid, the triethylamine salt of p-toluenesulfonic acid, the triethylamine salts of ethanedisulfonic acid, and the like.

There are cases where if the organic polymer solution contains a dopant in an excess amount relative to the amount of the polyaniline, casting and drying of this solution give an electrically conductive polyaniline film having poor strength. Therefore, the amount of a protonic acid to be added to a polyaniline for preparing a polyaniline solution preferably is equivalent or less, more preferably 0.75 equivalent or less, most preferably 0.5 equivalent or less, to amino groups in the backbone of the polyaniline.

The oxidizing agent which can be contained in the organic polymer solution of the present invention is explained below. This oxidizing agent is a high temperature-activable oxidizing agent which will show oxidizing ability only when the organic polymer solution is heated for drying. Preferred examples of such an oxidizing agent include thiuram-type compounds, sulfeneamide-type compounds, and oxime-type compounds.

These oxidizing agents which can preferably be used in the present invention are a kind of vulcanization accelerators well known as rubber chemicals which function to accelerate rubber vulcanization by a vulcanizing agent, reduce the necessary vulcanization duration, lower the vulcanizing temperature, and attain sulfur amount reduction, etc., and which also serve to improve the physical and chemical properties of the vulcanized rubber.

The thiuram-type compounds which can be used as the high temperature-activable oxidizing agent in the present invention are represented by the formula

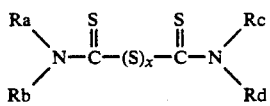

wherein Ra, Rb, Rc, and Rd each independently represents an alkyl group and x is an integer of from 1 to 6.

Examples of such thiuram-type compounds include monosulfides such as tetramethylthiuram monosulfide, tetraethylthiuram monosulfide, tetrapropylthiuram monosulfide, tetrabutylthiuram monosulfide, dipentamethylenethiuram monosulfide, and the like, disulfides such as tetramethylthiuram disulfide, tetraethylthiuram disulfide, tetrapropylthiuram disulfide, tetrabutylthiuram disulfide, N,N'-dimethyl-N,N'-diphenylthiuram disulfide, dipentamethylenethiuram disulfide, dicyclopentamethylenethiuram disulfide, and the like, tetrasulfides such as dipentamethylenethiuram tetrasulfide and the like, and hexasulfides such as dipentamethylenethiuram hexasulfide and the like.

The sulfenamide-type compounds which can be used as the high-temperature-activable oxidizing agent in the present invention are represented by the formula

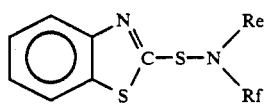

wherein Re and Rf each independently represents hydrogen atom, an alkyl group, or an oxyalkylene group.

Examples of such sulfenamide-type compounds include cyclohexylbenzothiazylsulfenamide, dicyclohexylbenzothiazylsulfenamide, oxydiethylenebenzothiazylsulfenamide, butylbenzothiazylsulfenamide, dipropylbenzothiazylsulfenamide, and the like.

The oxime-type compounds which can be used as the high temperature-activable oxidizing agent in the present invention are represented by the formula

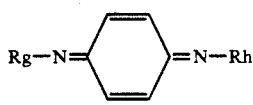

wherein Rg and Rh each independently represents hydroxyl group or benzoyl group. Examples of such oxime-type compounds include p-quinone dioxime, p,p'-dibenzoylquinone dioxime, and the like.

Although examples of the high temperature-activable oxidizing agent which can be used in the present invention were shown above, the oxidizing agent is not limited to those examples and any oxidizing agent which does not have oxidizing ability at ordinary temperature but has oxidizing ability only at temperatures of 60° C. or higher can be used in the present invention.

According to the present invention, an oxidation catalyst which accelerates oxidation by the oxidizing agent can be incorporated in the organic polymer solution along with the oxidizing agent. Such an oxidation catalyst increases the rate of the oxidation by the oxidizing agent during heat-drying of the organic polymer solution and thereby enables the resulting polyaniline film to develop electrical conductivity at an early stage and to finally have a high electrical conductivity. For example, such an oxidation catalyst preferably is at least one member selected from the group consisting of stearates, naphthenates, and acetylacetonates of cobalt, iron, or manganese. Particularly preferred of these are cobalt stearate, cobalt naphthenate, cobalt(II) acetylacetonate, and the like.

The oxidation reaction by the high temperature-activable oxidizing agent in the organic polymer solution of the present invention is explained below. For example, in the case where the oxidizing agent is a thiuram compound, it is thought that such an oxidizing agent forms a radical upon heating during the drying of the reduced-type polyaniline solution of the present invention and this radical draws out a hydrogen radical from the protonated reduced-type polyaniline present in the system, whereby a semiquinone radical is formed and the polyaniline comes to have electrical conductivity.

This mechanism may be illustrated as follows.

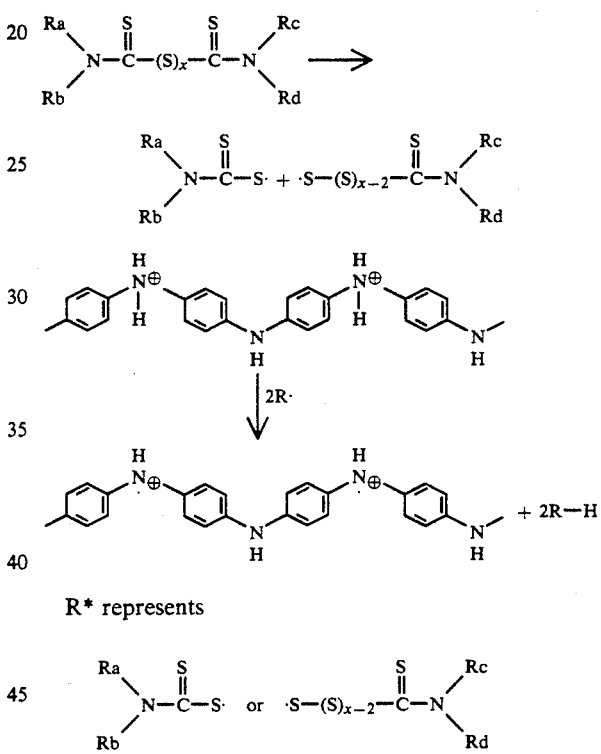

or the like.

Thiuram compounds such as those enumerated above yield radicals only when heated, as long as ultraviolet irradiation is not conducted. If an oxidizing agent having reactivity at room temperature like conventional oxidizing agents is present in a polyaniline solution, this solution cannot stably maintain its solution state since the oxidizing agent readily oxidizes the polyaniline and, as a result, the polyaniline doped in the solution readily precipitates because of its low solubility if the polyaniline concentration is several percents by weight or more, or the solution readily solidifies. In contrast, a solution containing a thiuram compound together with a reduced-type polyaniline and a protonic acid retains its stable solution state until it is heated, because the thiuram compound yields a radical only when heated.

The high temperature-activable oxidizing agent can be contained in the organic polymer solution of the present invention in an amount such that the number of molecules of the oxidizing agent present in the solution is from 0.01 to 1, preferably from 0.1 to 0.6, per four imino-p-phenylene structural units in the reduced-type polyaniline.

From the above-described organic polymer solution of the present invention, an electrically conductive polyaniline film can readily be obtained by casting and heat-drying the solution. The heat-drying conditions vary depending on the thickness of the polyaniline film to be obtained. For example, in the case where a polyaniline film with a film thickness of from 20 to 30 μm is to be obtained, it is proper that heat-drying is conducted at a temperature of usually from 60° to 200° C., preferably from 100° to 160° C., for a period of usually from 5 to 120 minutes, preferably from 15 to 60 minutes. The electrical conductivity of the thus-obtained conductive polyaniline film is usually about from $10^{-3}$ to $10^1$ S/cm. From an ESR spectrum of the conductive polyaniline film obtained, radical formation with a spin density of from $10^{19}$ to $10^{20}$ spins per gram is observed. These radicals are thought to be derived from semiquinone radicals formed by the mechanism described hereinabove. In the case where a thin conductive film having a thickness of about 0.05 μm is to be obtained, it is proper that heat-drying is conducted at a temperature of usually from 60° to 150° C., preferably from 80° to 100° C., for a period of usually from 10 seconds to 5 minutes, preferably from 10 seconds to 1 minute.

As described above, the organic polymer solution of the present invention, which contains dissolved therein an imino-p-phenylene type solvent-soluble polyaniline, a protonic acid or a derivative thereof having a $pK_a$ value of 4.8 or less, and an oxidizing agent of the above-described high temperature-activable type, is a solution which is stable at room temperature and from which a free-standing conductive polyaniline film can be readily obtained by casting or coating the solution, followed by heat-drying. It is also easy to obtain large-sized conductive films from the polymer solution.

Therefore, the organic polymer solution according to the present invention is utilizable in a wide variety of applications. For example, when the organic polymer solution is coated on an insulating substrate to form a conductive film thereon, this film, due to its electron conductivity, enables the substrate to stably exhibit high antistatic performance without being affected by moisture, water, etc.

Further, the organic polymer solution of the present invention can also be advantageously applied to the production of release sheets or pressure-sensitive tapes, in which by using the solution to form a conductive polyaniline film on a sheet or tape substrate, antistatic properties can be imparted to the final sheet or tape. Conductive films in such a form can also be advantageously used as a solid electrolyte in solid electrolytic capacitors or as an electromagnetic wave shield in various electronic machines and apparatus. Furthermore, from the solution of the present invention, electrically conductive fibers can also be readily obtained by spinning the polymer solution by a conventional method.

The present invention will be explained below by reference to the following Examples along with Reference Examples, but the invention is not construed as being limited thereto.

REFERENCE EXAMPLE 1

Production of Doped Conductive Organic Polymer by Oxidative Polymerization of Aniline Into a 10-liter separable flask equipped with a stirrer, thermometer, and straight-tube adapter were introduced 6,000 g of distilled water, 360 ml of 36% hydrochloric acid, and 400 g (4.295 mol) of aniline, in this order, to dissolve the aniline. On the other hand, 434 g (4.295 mol) of 97% concentrated sulfuric acid was added to 1,493 g of distilled water in a beaker with cooling with ice water to prepare an aqueous solution of sulfuric acid. This aqueous sulfuric acid solution was added to the above-prepared aniline solution in the separable flask and the whole flask was then cooled to −4° C. by means of a thermostatic low-temperature bath.

Subsequently, 980 g (4.295 mol) of ammonium peroxodisulfate was added to 2,293 g of distilled water in a beaker and dissolved therein to prepare an aqueous oxidizing agent solution.

While the whole flask was kept being cooled in the thermostatic low-temperature bath so that the temperature of the reaction mixture, i.e., acidic aqueous solution of an aniline salt, was maintained at −3° C. or lower, the above-prepared aqueous solution of ammonium peroxodisulfate was gradually added dropwise to the aniline salt solution from the straight-tube adapter using a tubing pump, at a rate of 1 ml/min or less with stirring. As polymerization proceeded, the solution which was colorless and transparent in the beginning turned greenish blue and then blackish green, and thereafter, a blackish green powder separated out.

Although the temperature of the reaction mixture rises when the powder separates out, it is crucially important to always maintain the temperature of the reaction system at 0° C. or lower, preferably at −3° C. or lower, in order to obtain a high molecular weight polymer to be contained in the organic polymer solution of the present invention. After initiation of the powder precipitation, the dropwise addition of the aqueous ammonium peroxodisulfate solution may be conducted at a slightly increased rate, for example, at about 8 ml/min. In this case, however, the addition rate should be regulated so as to maintain the temperature of the reaction mixture at −3° C. or lower, while monitoring the temperature. The dropwise addition of the aqueous ammonium peroxodisulfate solution was conducted and completed over 7 hours. Stirring of the resulting reaction mixture was further continued for additional 1 hour at a temperature of −3° C. or lower.

The precipitate was filtered off, washed with water and with acetone, and then dried in a vacuum at room temperature, thereby obtaining 430 g of a blackish green polymer powder. Part of the thus-obtained powder was press-shaped into a disk having a diameter of 13 mm and a thickness of 700 μm, and its electrical conductivity was measured by the van der Pauw's method and found to be 14 S/cm.

Production of Quinonediimine-Phenylenediamine Type Solvent-Soluble Polyaniline by Undoping of the Conductive Organic Polymer To 4 liters of 2N ammonia water was added 350 g of the above-obtained doped conductive organic polymer powder. This mixture was stirred with an automatic homomixer at 5,000 rpm for 5 hours. This treatment changed the mixture from blackish green to bluish purple.

The resulting powder was filtered off with a Buchner funnel, and was then washed in a beaker repeatedly with distilled water with stirring until the filtrate became neutral. The powder was further washed with acetone until the filtrate became colorless. Thereafter, the powder was dried in a vacuum at room temperature for 10 hours, thereby obtaining 280 g of an undoped polymer powder of a blackish brown color.

This polymer was soluble in N-methyl-2-pyrrolidone and its solubility in this solvent was 7.4% (8 g polymer was able to be dissolved in 100 g solvent). Further, the intrinsic viscosity [η] of the polymer as measured in that solvent at 30° C. was 1.23 dl/g.

The solubility of this polymer in each of dimethyl sulfoxide and dimethylformamide was 1% or less. The polymer was substantially insoluble in tetrahydrofuran, pyridine, 80% aqueous acetic acid solution, 60% aqueous formic acid solution, and acetonitrile.

A powder of this undoped quinonediimine-phenylenediamine type solvent-soluble polyaniline was formed into a disk shape. Upon irradiation with light at an exciting wavelength of 457.9 nm, this sample gave a laser Raman spectrum as shown in FIG. 1.

For the purpose of comparison, a laser Raman spectrum of an undoped polyaniline which was the same as that disclosed in Y. Furukawa et al., Synth. Met., 16, 189 (1986) is shown in FIG. 2, which spectrum was also obtained by irradiation at an exciting wavelength of 457.9 nm. This polyaniline had been obtained by the electrochemical oxidative polymerization of aniline on a platinum electrode.

Further, laser Raman spectra of the above-obtained undoped quinonediimine-phenylenediamine type solvent-soluble polyaniline in the range of from 1,400 to 1,700 cm$^{-1}$ are shown in FIG. 3, which spectra were obtained at three exciting-laser-light wavelengths, i.e., 488.0 nm, 476.5 nm, and 457.9 nm. FIG. 3 shows that as the exciting wavelength was changed toward the shorter-wavelength side, that is, from 488.0 nm through 476.5 nm to 457.9 nm, the Ia/Ib ratio changed and reached 1.0 or more at 457.9 nm. That is, the relative intensities of Ia and Ib were reversed as the exciting wavelength changed from 488.0 nm to 457.9 nm.

An electronic spectrum of the above-obtained quinonediimine-phenylenediamine type solvent-soluble polyaniline is shown in FIG. 4.

The above-obtained organic solvent-soluble polyaniline was then analyzed by GPC in which three kinds of GPC columns for N-methyl-2-pyrrolidone connected with each other were used. As an eluting solution, a 0.01 mol/l lithium bromide solution in N-methyl-2-pyrrolidone was used. The GPC results obtained are shown in FIG. 5.

Figure 5:
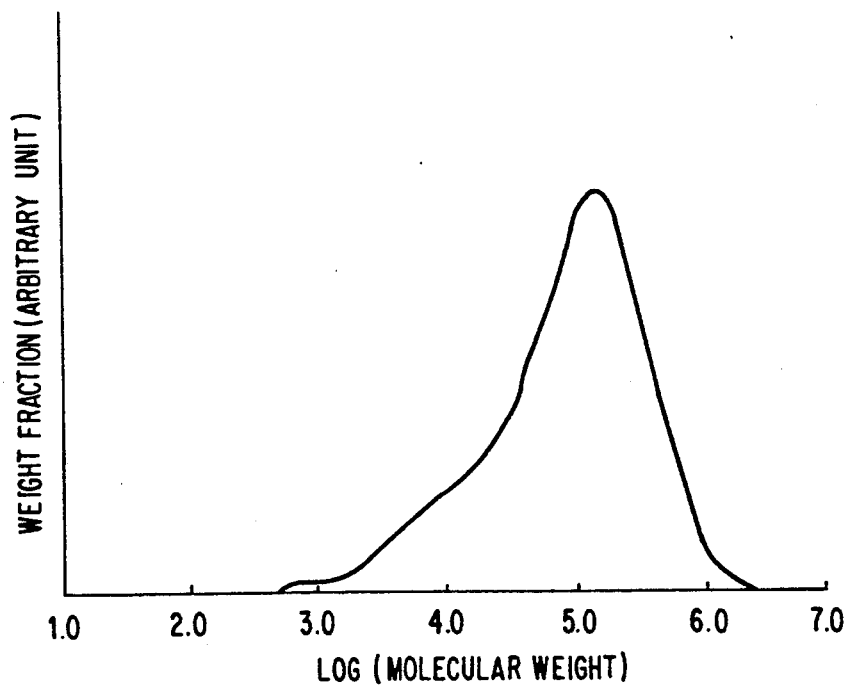
FIG. 5 is a graph showing one example of the molecular weight distribution as determined by GPC of a quinonediimine-phenylenediamine type solvent-soluble polyaniline.

From the results in FIG. 5, it was found that the quinonediimine-phenylenediamine type solvent-soluble polyaniline had a number-average molecular weight of 23,000 and a weight-average molecular weight of 160,000 (both in terms of polystyrene value).

Likewise, several kinds of quinonediimine-phenylenediamine type solvent-soluble polyanilines having different intrinsic viscosities [η], which were measured at 30° C. in N-methyl-2-pyrrolidone, were obtained by changing the reaction conditions. The intrinsic viscosities of these polyanilines and their number-average molecular weights and weight-average molecular weights as determined by GPC are shown in Table 1.

TABLE 1

| Intrinsic Viscosity [η] (dl/g) | GPC Molecular Weight | |
|---|---|---|
| | Number-average | Weight-average |
| 0.40 | 10000 | 48000 |
| 0.48 | 12000 | 120000 |
| 0.56 | 14000 | 130000 |
| 0.76 | 18000 | 140000 |
| 1.23 | 23000 | 160000 |

REFERENCE EXAMPLE 2

Preparation of Free-Standing Film from Oxidized-Type Soluble Polyaniline

To 95 g of N-methyl-2-pyrrolidone was added 5 g of a powder of the undoped oxidized-type polyaniline obtained in Reference Example 1. The polymer was then dissolved in the solvent at room temperature to obtain a blackish blue solution. This solution was filtered through a G3 glass filter with suction and, as a result, the amount of the insoluble matter remaining on the filter was extremely slight. This filter was cleaned with acetone to separate the insoluble matter therefrom, and the insoluble matter was dried and weighed. As a result, the weight thereof was 75 mg, indicating that 98.5% of the polymer had dissolved in the solvent and 1.5% thereof remained undissolved.

The thus-obtained quinonediimine-phenylenediamine type solvent-soluble polyaniline solution was cast on a glass plate and spread thereon by wiping with a glass rod, and the N-methyl-2-pyrrolidone was then removed by evaporation in a circulating hot-air drying chamber at 150° C. for 2 hours. Thereafter, the glass plate having the thus-dried film was immersed in cold water, upon which the film peeled of itself from the glass plate. Thus, a polymer film having a thickness of 40 μm was obtained.

This film was washed with acetone and then air-dried at room temperature to obtain a film having a copper-like metallic sheen.

Some films were obtained by varying the evaporation conditions.

Films of the above kind which have been dried at different temperatures differ from one another in strength and solubility. Films obtained through drying at 100° C. or lower temperatures are slightly soluble in N-methyl-2-pyrrolidone and have relatively low strength, while films obtained through heating at 130° C. or higher temperatures are extremely tough and insoluble in N-methyl-2-pyrrolidone and other organic solvents and also in concentrated sulfuric acid. The reason why the polymer becomes insoluble upon higher-temperature heating will be that heating at such a high temperature causes the polymer molecules to crosslink during the heating.

The thus-obtained undoped quinonediimine-phenylenediamine type solvent-soluble polyaniline films each had an electrical conductivity on the order of 10$^{-11}$ S/cm.

The film did not develop cracks even when bent 10,000 times, and had a tensile strength of 850 Kg/cm$^2$.

REFERENCE EXAMPLE 3

Doping of Free-Standing Film with Protonic Acid

The free-standing films obtained in Reference Example 2 through 160° C. heat-drying for 2 hours were immersed in 1N sulfuric acid, perchloric acid, and hydrochloric acid aqueous solutions, respectively, at room temperature for 66 hours. These films were then washed with acetone and air-dried to obtain electrically conductive films.

These films each was of a dark blue color, and their electrical conductivities were 9 S/cm, 13 S/cm, and 6 S/cm, respectively. The film doped with perchloric acid had a tensile strength of 520 Kg/cm$^2$.

REFERENCE EXAMPLE 4

Figure 6:
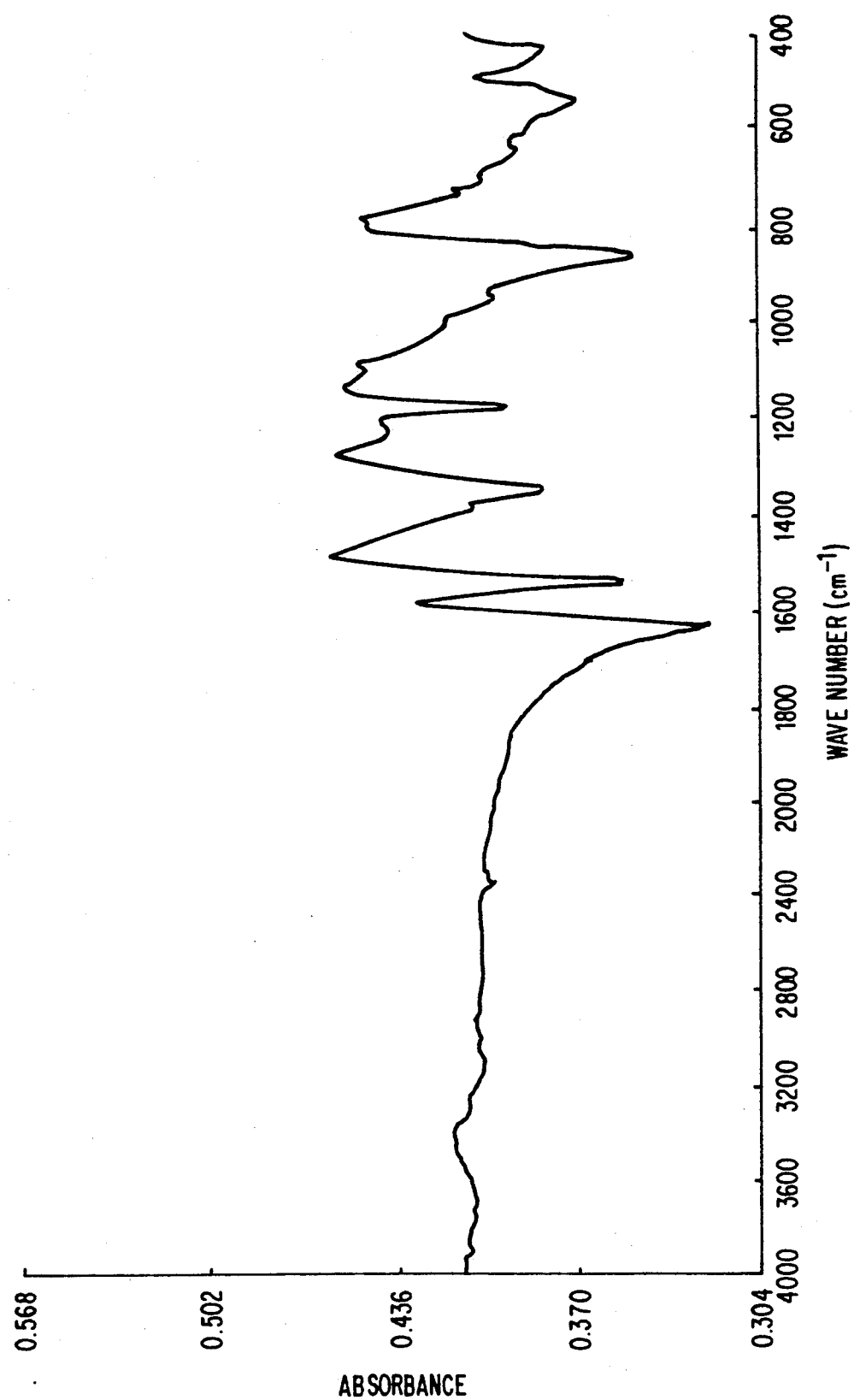
FIG. 6 is an FT-IR spectrum of an undoped, quinonediimine-phenylenediamine type solvent-soluble polyaniline, the spectrum being obtained by the KBr disk method.
Figure 7:
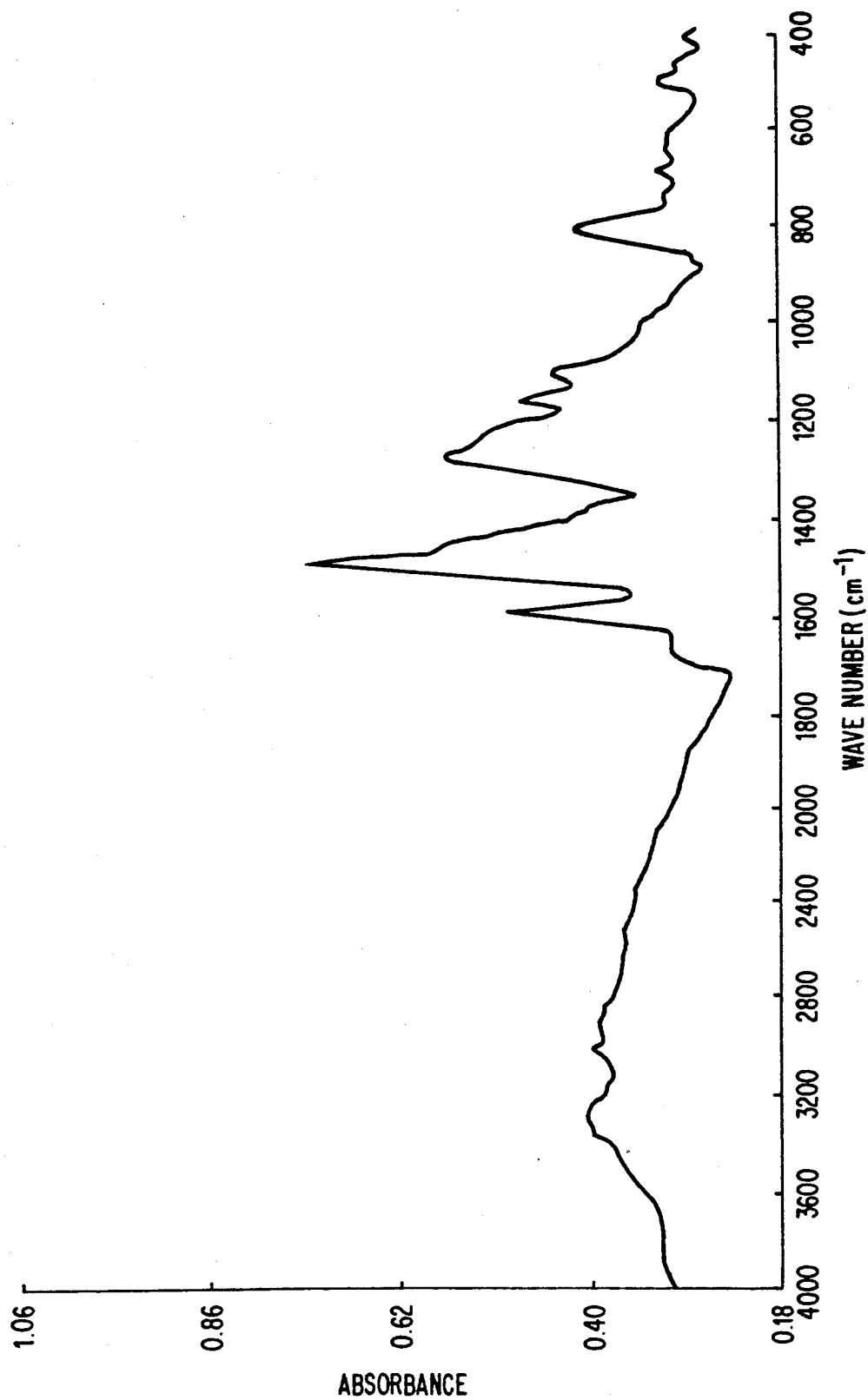
FIG. 7 is an FT-IR spectrum of a solvent-insoluble film obtained by casting a quinonediimine-phenylenediamine type solvent-soluble polyaniline, the spectrum being obtained by the KBr disk method.

Spectra and Structures of Undoped Quinonediimine-Phenylenediamine Type Soluble Polyaniline and Undoped Insoluble Film-Form Polyaniline FT-IR spectra of the soluble polymer powder obtained in Reference Example 1 and the insoluble polymer film obtained in Reference Example 2 are shown in FIG. 6 and FIG. 7, respectively, which spectra were obtained by the KBr disk method. Although the spectrum of the insoluble polymer film of Reference Example 2 has a weak absorption at 1,660 cm$^{-1}$ which will be attributable to the remaining solvent N-methyl-2-pyrrolidone, the two spectra are almost the same. Therefore, it can be thought that although the solvent-soluble polymer was crosslinked and insolubilized by the heat-drying after casting, it did not undergo a substantial change in chemical structure through the treatment.

Figure 8:
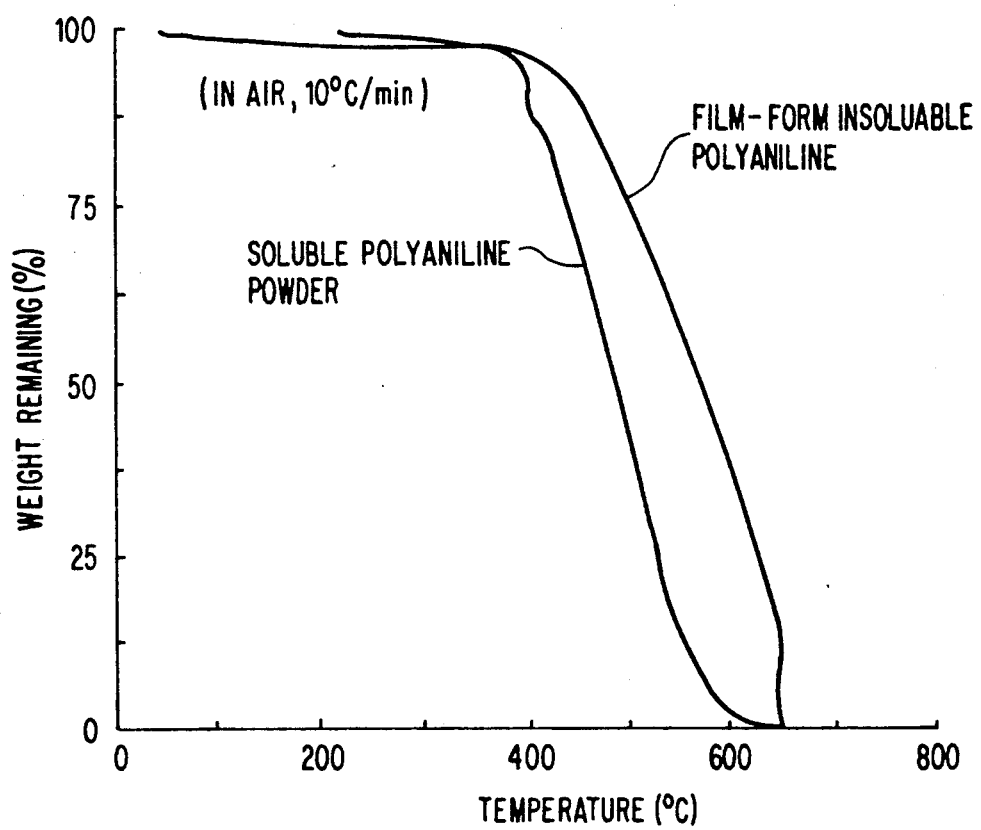
FIG. 8 shows results of thermogravimetric analyses of the above quinonediimine-phenylenediamine type solvent-soluble polyaniline powder and an insolubilized film obtained therefrom.

Results of thermogravimetric analyses of the soluble polymer powder obtained in Reference Example 1 and the insoluble polymer film obtained in Reference Example 2 are shown in FIG. 8. Both polymers have high heat resistance. The fact that the insoluble film remains undecomposed until higher temperatures and was insoluble in concentrated sulfuric acid indicates that polymer molecules in the insoluble film have been crosslinked.

Figure 9:
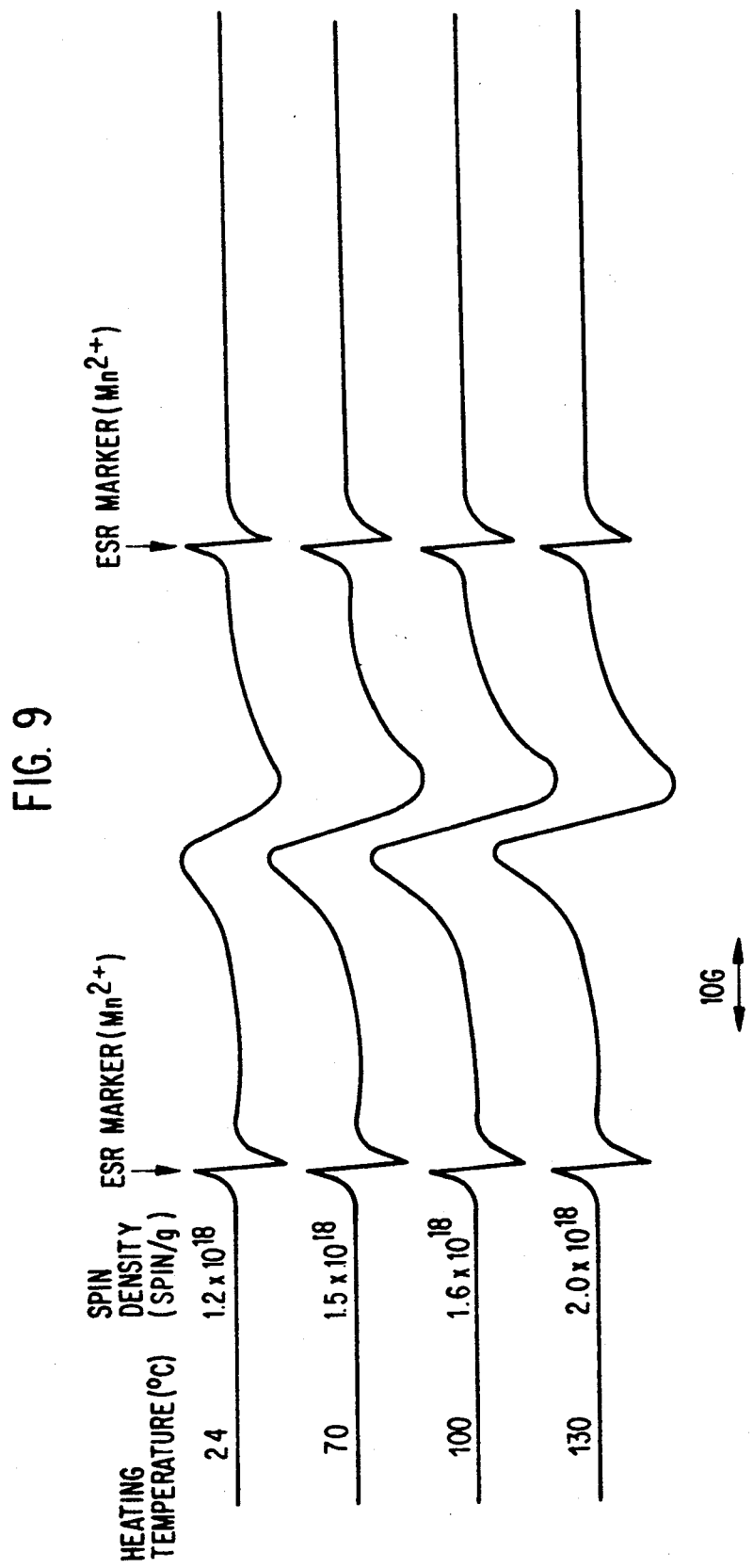
FIG. 9 shows changes in ESR spectrum of a quinonediimine-phenylenediamine type solvent-soluble polyaniline with heating.

ESR spectra of the soluble polyaniline as obtained in Reference Example 1 are shown in FIG. 9. The spin density of the soluble polymer is 1.2×10$^{18}$ spins per gram and it increases as the heating temperature rises, showing that radicals formed upon the heating. It is thought that coupling of these radicals forms crosslinks in the polymer and, as a result, the heated film becomes insoluble.

The following are results of elemental analyses of the soluble polymer of Reference Example 1 and the insoluble polymer of Reference Example 2.

Soluble Polymer

C, 77.19; H, 4,76; N, 14.86 (total 96.81)

Insoluble Polymer

C, 78.34; H, 4.99; N, 15.16 (total 98.49)

When the above elemental analysis results are normalized to C=12.00, the composition of the soluble polymer is; C 12.00, H 8.82, N 1.98, and that of the insoluble polymer is; C 12.00, H 9.11, N 1.99. On the other hand, the composition of the quinonediimine structural unit and that of the phenylenediamine structural unit after normalization to C=12.00 are as follows.

Quinonediimine Structural Unit

C 12, H 8, N 2

Phenylenediamine Structural Unit

C 12, H 10, N 2

From the above, each of the soluble polymer and the insoluble polymer can be regarded as a polymer having both a quinonediimine structural unit and a phenylenediamine structural unit as major repeating units, as described hereinabove.

Figure 10:
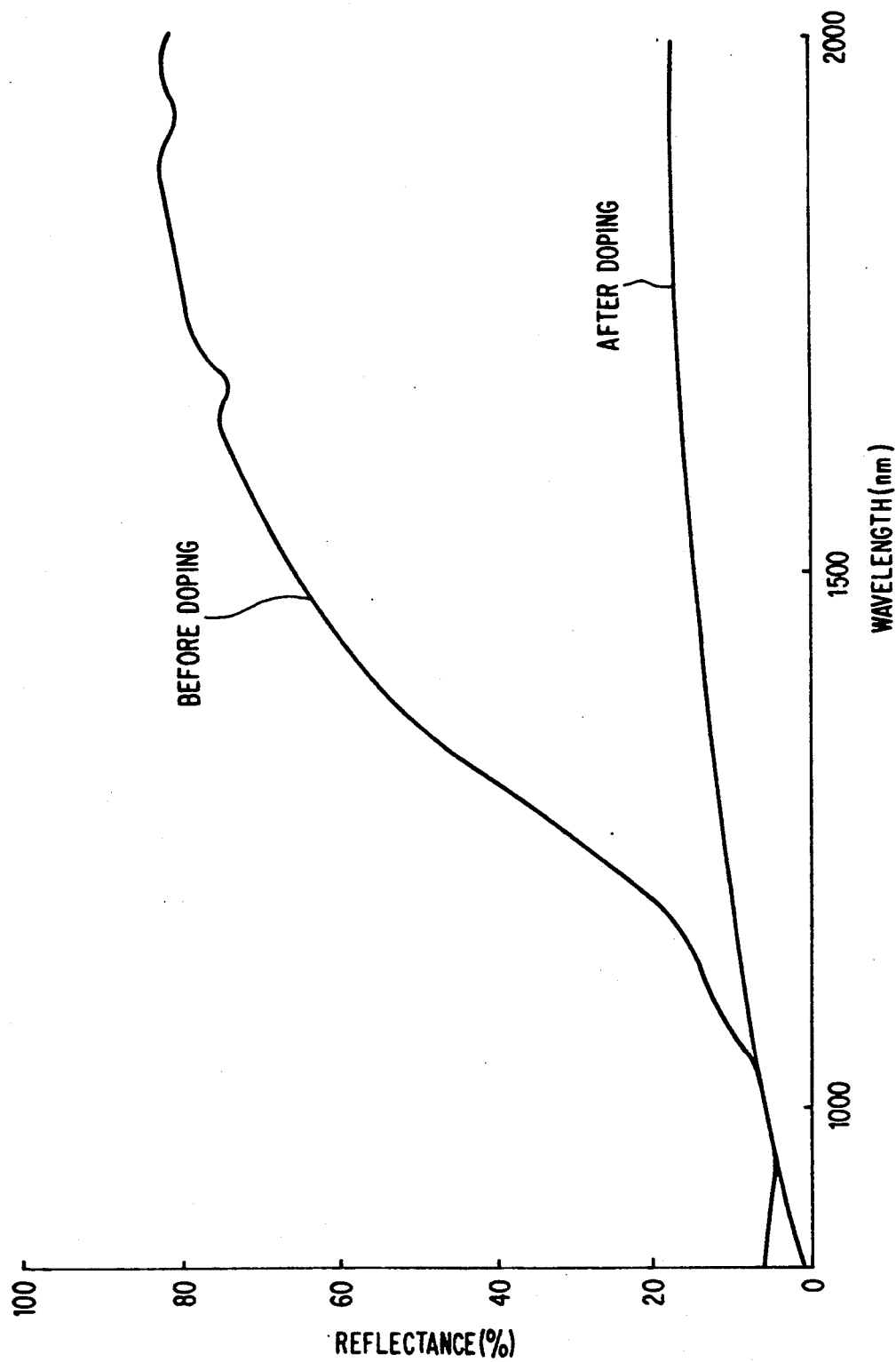
FIG. 10 shows near-infrared-region reflection spectra of an undoped, quinonediimine-phenylenediamine type solvent-soluble polyaniline film and a film obtained by doping the undoped film with perchloric acid.

FIG. 10 shows reflection spectra in the visible and near infrared region of the undoped quinonediimine-phenylenediamine type solvent-soluble polyaniline film obtained in Reference Example 2 and of the perchloric acid-doped film obtained in Reference Example 3. The spectra show that the undoped film reflects most of the incident near infrared light, whereas the doped film absorbs most of the incident near infrared light and reflects almost none of the light. This absorption is attributable to polarons or bipolarons which have been formed by the doping with the protonic acid and bring about electrical conductivity.

Further, by doping the undoped film with perchloric acid, the ESR absorption of the film increases greatly and the spin density thereof reaches as high as 3.8×10$^{21}$ spins per gram. This is attributed to formation of semiquinone radicals, i.e., polarons.

REFERENCE EXAMPLE 5

The polymer films obtained in Reference Example 2 were immersed in aqueous or alcoholic solutions of protonic acids having various pK$_a$ values at room temperature for 12 hours, and the effect of doping was examined. The electrical conductivities of the polymer films thus doped with protonic acids having various pk$_a$ values are shown in Table 2, which shows that protonic acids having pk$_a$ values of 4.8 or less are effective in doping the polymer.

TABLE 2

| Dopant | pKa | Electrical conductivity (S/cm) |
|---|---|---|
| Hydrochloric acid [a] | −0.47 | 6 |
| p-Toluenesulfonic acid [a] | (0.7) [d] | 3.1 |
| Oxalic acid [b] | 1.23 | 1.9 |
| Dichloroacetic acid [a] | 1.48 | 0.5 |
| Malonic acid [b] | 2.78 | 1.4 |
| Monochloroacetic acid | 2.85 | 1.7 × 10$^{-2}$ |
| Malic acid [a] | 3.4 | 8.5 × 10$^{-2}$ |
| p-Nitrobenzoic acid [b] | 3.46 | 3.7 × 10$^{-4}$ |
| Formic acid [c] | 3.75 | 2.1 × 10$^{-2}$ |
| Acrylic acid [c] | 4.25 | 4.8 × 10$^{-2}$ |
| Acetic acid [c] | 4.75 | 3.7 × 10$^{-2}$ |
| Propionic acid [c] | 4.88 | 4.1 × 10$^{-11}$ |

Note:
[a] Used as 1N aqueous solution.
[b] Used as 1N ethanol solution.
[c] Used in undiluted or pure state.
[d] The value is for benzenesulfonic acid.

REFERENCE EXAMPLE 6

Preparation of Imino-p-Phenylene Type Solvent-Soluble Polyaniline

To 400 ml of ethyl ether was added 90 g of the quinonediimine-phenylenediamine type solvent-soluble polyaniline as obtained in Reference Example 1. This mixture was stirred to disperse the polymer. To this dispersion was added 26.93 g of phenylhydrazine little by little. After a while, the mixture began to evolve nitrogen gas vigorously. This reaction mixture was kept being stirred for 2.5 hours. Thereafter, the solid matter in the mixture was filtered off with suction by means of a Nutche funnel and then washed with nitrogen-replaced acetone several times.

The thus-obtained polymer powder was dried in a vacuum at room temperature for 7 hours, thereby obtaining 86.6 g of an imino-p-phenylene type solvent-soluble polyaniline as a grayish white powder. This polymer was stored in a gloved box in which the air had been replaced with argon.

EXAMPLE 1

15 Grams of the imino-p-phenylene type organic solvent-soluble polyaniline as obtained in Reference Example 6 was dissolved in 85 g of N-methyl-2-pyrrolidone to prepare 100 g of a 15 wt % polyaniline solution. This solution was then filtered through a G-2 glass filter. The filtrate is called Solution A. On the other hand, 9.45 g of p-toluenesulfonic acid monohydrate was dissolved in 90.55 g of N-methyl-2-pyrrolidone to prepare 100 g of a 9.45% by weight solution of the acid. This solution is called Solution B. In 10 g of Solution B was dissolved 0.495 g of tetramethylthiuram Subsequently, this solution containing dissolved therein p-toluenesulfonic acid and the thiuram compound was gradually added to 10 g of Solution A with stirring, thereby obtaining a homogeneous solution without forming a precipitate. This solution was cast on a glass plate and heat-dried at 120° C. for 30 minutes to obtain a free-standing polyaniline film having a thickness of 25 $\mu$m. This film had an electrical conductivity of 1.67 S/cm.

COMPARATIVE EXAMPLE 1

A polyaniline film was obtained in the same manner as in Example 1 except that tetramethylthiuram disulfide was not dissolved in Solution B. This film had an electrical conductivity of $8.8 \times 10^{-3}$ S/cm. This film was allowed to stand in air for a weak and, as a result, the electrical conductivity thereof became a value on the order of $10^0$ S/cm.

EXAMPLE 2

A homogeneous polyaniline solution was obtained without forming a precipitate in the same manner as in Example 1 except that 0.508 g of tetrabutylthiuram disulfide was used in place of tetramethylthiuram disulfide.

Using this solution, a free-standing polyaniline film having a thickness of 28 $\mu$m was obtained in the same manner as in Example 1. This film had an electrical conductivity of 0.12 S/cm.

EXAMPLE 3

A homogeneous solution containing a polyaniline, p-toluenesulfonic acid, and a thiuram compound was obtained without forming a precipitate in the same manner as in Example 1 except that 0.478 g of dipentamethylenethiuram tetrasulfide was used in place of tetramethylthiuram disulfide.

Using this solution, a free-standing polyaniline film having a thickness of 30 $\mu$m was obtained in the same manner as in Example 1. This film had an electrical conductivity of 0.68 S/cm.

EXAMPLE 4

A homogeneous polyaniline solution was obtained without forming a precipitate in the same manner as in Example 1 except that 0.352 g of N-oxydiethylene-2-benzothiazylsulfenamide was used in place of tetramethylthiuram disulfide.

Using this solution, a free-standing polyaniline film having a thickness of 28 $\mu$m was obtained in the same manner as in Example 1. This film had an electrical conductivity of 0.21 S/cm.

EXAMPLE 5

A homogeneous polyaniline solution was obtained without forming a precipitate in the same manner as in Example 1 except that 0.329 g of cyclohexylbenzothiazylsulfenamide was used in place of tetramethylthiuram disulfide.

Using this solution, a free-standing polyaniline film having a thickness of 28 $\mu$m was obtained in the same manner as in Example 1. This film had an electrical conductivity of 0.23 S/cm.

EXAMPLE 6

A homogeneous polyaniline solution was obtained without forming a precipitate in the same manner as in Example 1 except that 0.171 g of p-quinone dioxime was used in place of tetramethylthiuram disulfide.

Using this solution, a free-standing polyaniline film having a thickness of 28 $\mu$m was obtained in the same manner as in Example 1. This film had an electrical conductivity of 2.1 S/cm.

EXAMPLE 7

A homogeneous polyaniline solution was obtained without forming a precipitate in the same manner as in Example 1 except that 1.44 g of p,p'-dibenzoylquinone dioxime was used in place of tetramethylthiuram disulfide.

Using this solution, a free-standing polyaniline film having a thickness of 28 $\mu$m was obtained in the same manner as in Example 1. This film had an electrical conductivity of 0.96 S/cm.

EXAMPLE 8

A homogeneous polyaniline solution was obtained without forming a precipitate in the same manner as in Example 6 except that before p-quinone dioxime was dissolved, 0.778 g of cobalt stearate was dissolved.

Using this solution, a free-standing polyaniline film having a thickness of 28 $\mu$m was obtained in the same manner as in Example 1. This film had an electrical conductivity of 10.9 S/cm.

EXAMPLE 9

A homogeneous polyaniline solution was obtained without forming a precipitate in the same manner as in Example 1 except that 0.778 g of cobalt stearate was used in place of tetramethylthiuram disulfide.

Using this solution, a free-standing polyaniline film having a thickness of 28 $\mu$m was obtained in the same manner as in Example 1. This film had an electrical conductivity of 0.35 S/cm.

EXAMPLE 10

10 Grams of the imino-p-phenylene type organic solvent-soluble polyaniline as obtained in Reference Example 6 was dissolved in 90 g of N-methyl-2-pyrrolidone to prepare 100 g of a 10 wt % polyaniline solution. This solution was then filtered through a G-2 glass filter. The filtrate is called Solution C.

On the other hand, 5.97 g of 1,5-naphthalenedisulfonic acid tetrahydrate was dissolved in 94 g of N-methyl-2-pyrrolidone to prepare 100 g of a 5.97 wt % solution of the acid. This solution is called Solution D. In 10 g of Solution D was dissolved 0.198 g of tetramethylthiuram disulfide.

Subsequently, this solution containing dissolved therein 1,5-naphthalenedisulfonic acid and the thiuram compound was gradually added to 10 g of Solution C with stirring, thereby obtaining a homogeneous solution without forming a precipitate. This solution was cast on a glass plate and heat-dried at 120° C. for 30 minutes to obtain a free-standing polyaniline film having a thickness of 24 μm. This film had an electrical conductivity of 1.3 S/cm.

This film was analyzed by ESR spectroscopy. As a result, an ESR spectrum having sharp signals with a narrow line width was obtained. The spin density thereof was $1.2 \times 10^{20}$ spins per gram.

EXAMPLE 11

A homogeneous polyaniline solution was obtained without forming a precipitate in the same manner as in Example 10 except that 0.319 g of dipentamethylenethiuram disulfide was used in place of tetramethylthiuram disulfide.

Using this solution, a free-standing polyaniline film having a thickness of 26 μm was obtained in the same manner as in Example 10. This film had an electrical conductivity of 0.38 S/cm.

COMPARATIVE EXAMPLE 2

The same procedures for preparing a polyaniline solution as in Example 1 were conducted, except that anhydrous ferric chloride which is a common oxidizing agent was used in place of tetramethylthiuram disulfide. As a result, the reduced-type polyaniline was readily oxidized at room temperature to an oxidized-type polyaniline. The solution containing this polyaniline gradually solidified since the solution also contained a protonic acid along with the polyaniline.

EXAMPLE 12

0.2 Gram of the imino-p-phenylene type organic solvent-soluble polyaniline as obtained in Reference Example 6 was dissolved in 9.8 g of N-methyl-2-pyrrolidone at room temperature to prepare 10 g of a 2 wt % polyaniline solution. This solution is called Solution E.

On the other hand, 0.21 g of p-toluenesulfonic acid monohydrate was dissolved in 9.79 g of N-methyl-2-pyrrolidone to prepare 10 g of 2.1 wt % solution of the acid. This solution is called Solution F. In 10 g of Solution F was dissolved 0.044 g of tetramethylthiuram disulfide.

Subsequently, this solution containing dissolved therein p-toluenesulfonic acid and the thiuram compound was gradually added to Solution E at room temperature with stirring, thereby obtaining a homogeneous solution without forming a precipitate.

This solution was spin-coated on a 75 μm-thick poly(ethylene terephthalate) film having length and width dimensions of 10 cm by 10 cm, and the coating was heat-dried at 120° C. for 5 minutes to obtain a polyaniline film. This film had a surface resistivity of $3.2 \times 10^5$ Ω/□. Examination of a section of this film with a transmission electron microscope revealed that this film had a thickness of 0.08 μm.

EXAMPLE 13

A polyaniline film was obtained in the same manner as in Example 12 except that 0.0228 g of p-quinone dioxime was used in place of tetramethylthiuram disulfide. This film had a surface resistivity of $2.5 \times 10^5$ Ω/□.

EXAMPLE 14

A polyaniline film was obtained in the same manner as in Example 13 except that before p-quinone dioxime was dissolved, 0.103 g of cobalt stearate was dissolved. This film had a surface resistivity of $1.1 \times 10^5$ Ω/□.

EXAMPLE 15

A polyaniline film was obtained in the same manner as in Example 12 except that 0.103 g of cobalt stearate was used in place of tetramethylthiuram disulfide. This film had a surface resistivity of $8.5 \times 10^6$ Ω/□.

COMPARATIVE EXAMPLE 3

A polyaniline film was obtained in the same manner as in Example 12 except that tetramethylthiuram disulfide was not used. This film had a surface resistivity of $4 \times 10^9$ Ω/□.

While the invention has been described in detail and with reference to specific embodiments thereof, it will be apparent to one skilled in the art that various changes and modifications can be made therein without departing from the spirit and scope thereof.

What is claimed is:

1. An organic polymer solution comprising an organic solvent and, dissolved therein,
    (a) an organic polymer which has an imino-p-phenylene structural unit of the formula

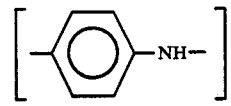

as a major repeating unit and is organic solvent-soluble,
    (b) a protonic acid having a $pK_a$ value of 4.8 or less or a derivative thereof,
    (c) at least one oxidizing agent which does not have oxidizing ability at ordinary temperature but has oxidizing ability at temperatures not lower than 60° C., selected from the group consisting of a thiuram-type compound represented by the formula

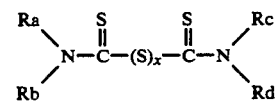

wherein Ra, Rb, Rc, and Rd each independently represents an alkyl group and x is an integer of from 1 to 6, a sulfenamide-type compound represented by the formula

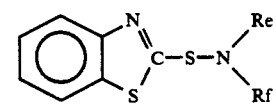

wherein Re and Rf each independently represents hydrogen atom, an alkyl group, or an alkylene group, or an oxime-type compound represented by the formula

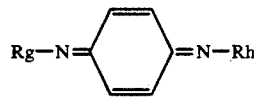

wherein Rg and Rh each independently represents hydroxyl group or benzoyl group and an oxidation catalyst.

2. An organic polymer solution as claimed in claim 1, wherein said oxidation catalyst is at least one member selected from the group consisting of stearates, naphthenates, and acetylacetonates of cobalt, iron, or manganese.

3. An organic polymer solution as claimed in claim 1, wherein said organic polymer has an intrinsic viscosity $[\eta]$ of 0.40 dl/g or more as measured at 30° C. in N-methyl-2-pyrrolidone.

* * * * *